United States Patent
Takahira et al.

(10) Patent No.: US 9,223,071 B2
(45) Date of Patent: Dec. 29, 2015

(54) LIGHT-EMITTING DEVICE, VEHICLE HEADLAMP AND ILLUMINATION APPARATUS

(71) Applicant: Sharp Kabushiki Kaisha, Osaka-shi (JP)

(72) Inventors: Yoshiyuki Takahira, Osaka (JP); Koji Takahashi, Osaka (JP); Yosuke Maemura, Osaka (JP); Tomohiro Sakaue, Osaka (JP); Kensei Toyota, Osaka (JP)

(73) Assignee: SHARP KABUSHIKI KAISHA, Osaka-Shi (JP)

( * ) Notice: Subject to any disclaimer, the term of this patent is extended or adjusted under 35 U.S.C. 154(b) by 89 days.

(21) Appl. No.: 13/972,634

(22) Filed: Aug. 21, 2013

(65) Prior Publication Data
US 2014/0056021 A1 Feb. 27, 2014

(30) Foreign Application Priority Data
Aug. 27, 2012 (JP) ................................. 2012-187038

(51) Int. Cl.
*F21V 9/00* (2015.01)
*F21V 8/00* (2006.01)
*F21S 8/10* (2006.01)

(52) U.S. Cl.
CPC ........... *G02B 6/0003* (2013.01); *F21S 48/1145* (2013.01); *F21S 48/1225* (2013.01); *F21S 48/1241* (2013.01); *F21S 48/1317* (2013.01); *G02B 6/0008* (2013.01)

(58) Field of Classification Search
CPC . G02B 6/0003; G02B 6/0008; F21S 48/1145; F21S 48/1241
USPC .................................. 362/510–511, 553, 555
See application file for complete search history.

(56) References Cited

U.S. PATENT DOCUMENTS

| | | | |
|---|---|---|---|
| 2005/0105301 A1 | 5/2005 | Takeda et al. | |
| 2009/0040598 A1 | 2/2009 | Ito | |
| 2011/0216550 A1 | 9/2011 | Koike et al. | |
| 2011/0279007 A1* | 11/2011 | Kishimoto | ...................... 313/45 |
| 2013/0182452 A1 | 7/2013 | Takahira et al. | |

FOREIGN PATENT DOCUMENTS

| | | |
|---|---|---|
| JP | 2005-150041 | 6/2005 |
| JP | 2009-43668 | 2/2009 |
| JP | 2011-181381 | 9/2011 |
| JP | 2011-222260 | 11/2011 |

* cited by examiner

*Primary Examiner* — Jason Moon Han
(74) *Attorney, Agent, or Firm* — Morrison & Foerster LLP

(57) ABSTRACT

A headlamp includes the laser chip which emits excitation light, a light-emitting section which contains a phosphor, and an optical rod. The excitation light emitted from the laser chip is optically guided by the optical rod, and the light output from the optical rod enters the light-emitting section. An edge is present in the light intensity distribution of the light-emitting section.

8 Claims, 18 Drawing Sheets

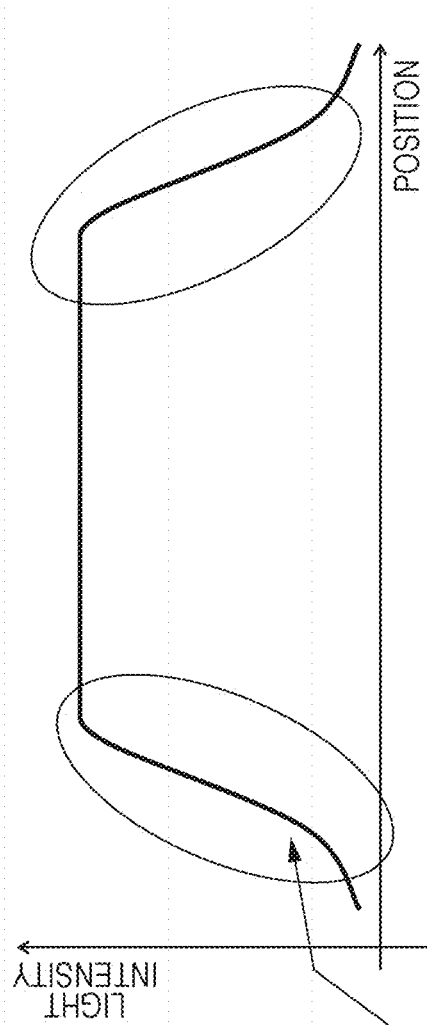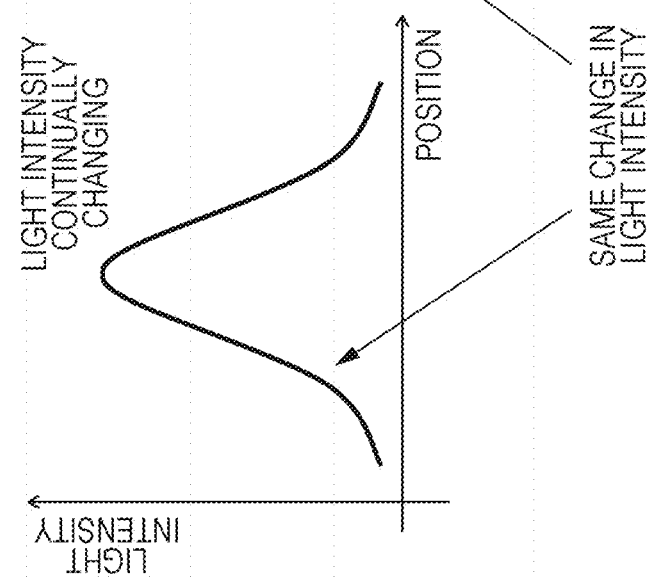

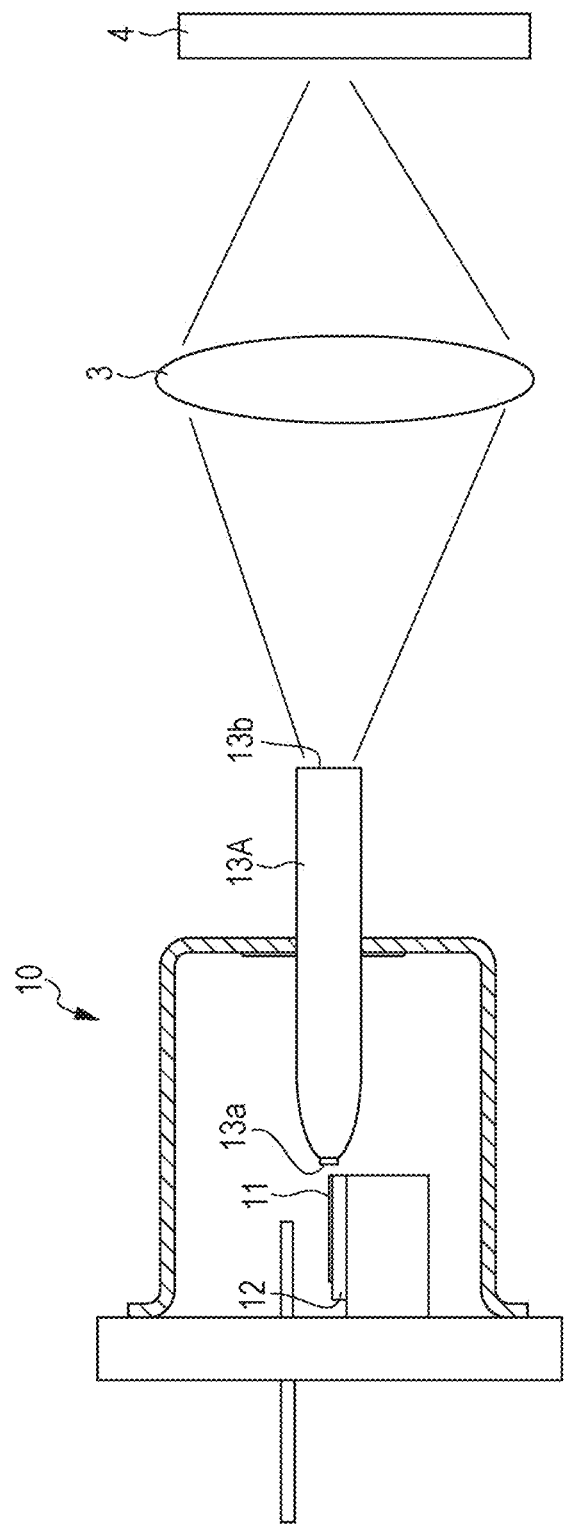

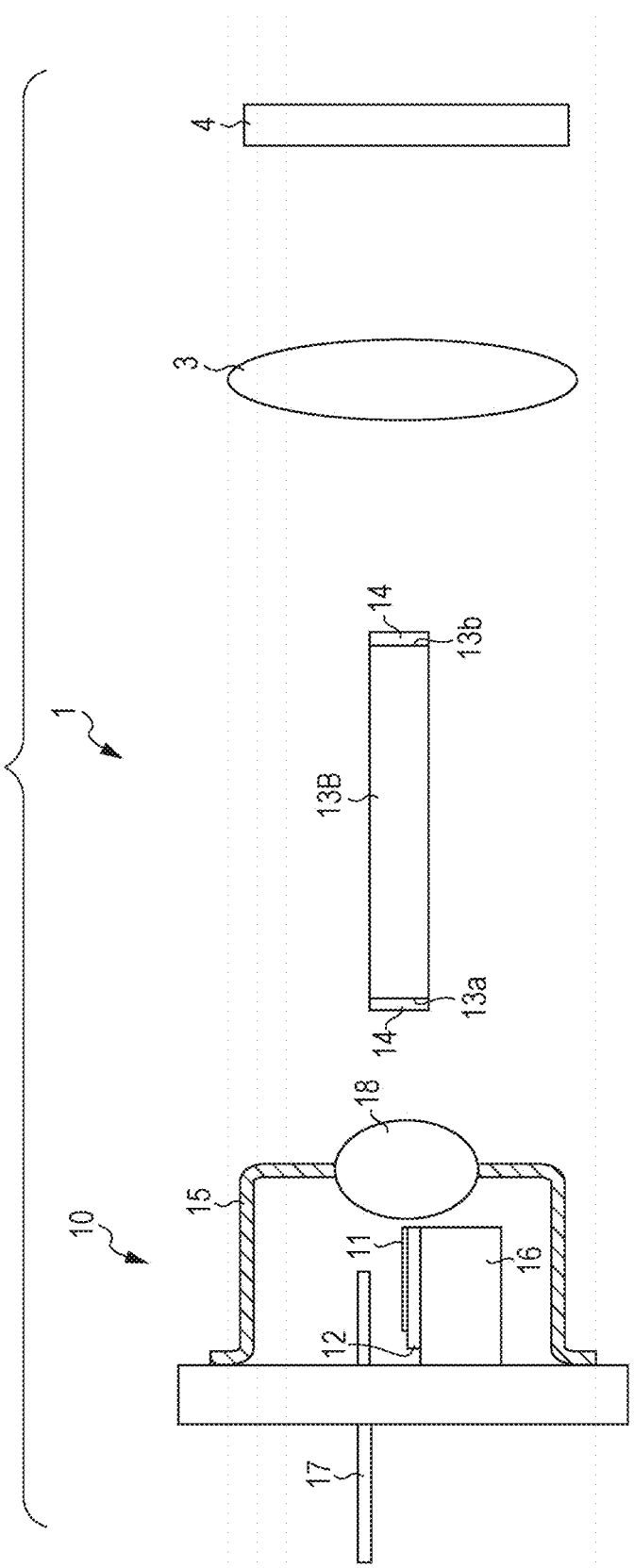

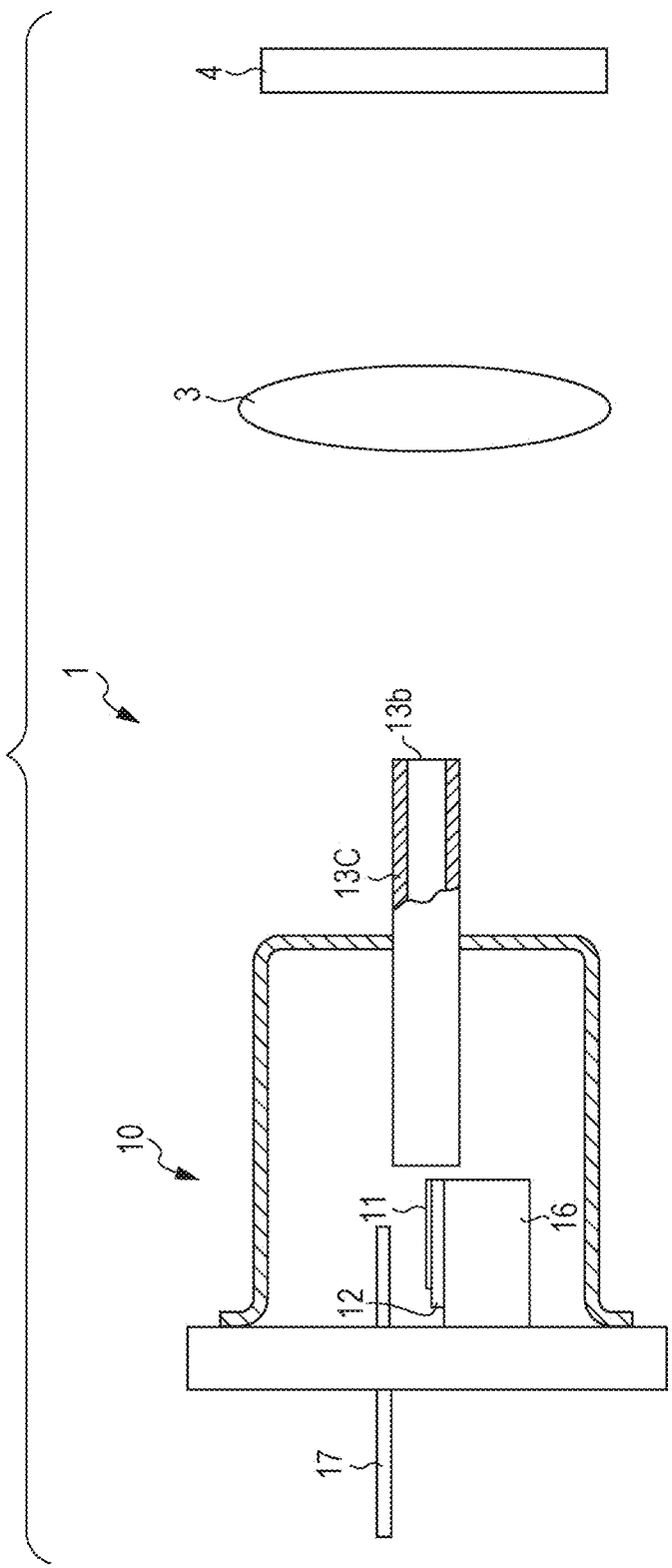

LIGHT INTENSITY DISTRIBUTION ON EXIT END SURFACE OF WAVEGUIDE MEMBER

LIGHT INTENSITY DISTRIBUTION ON ENTRANCE END SURFACE OF WAVEGUIDE MEMBER

NG

OK

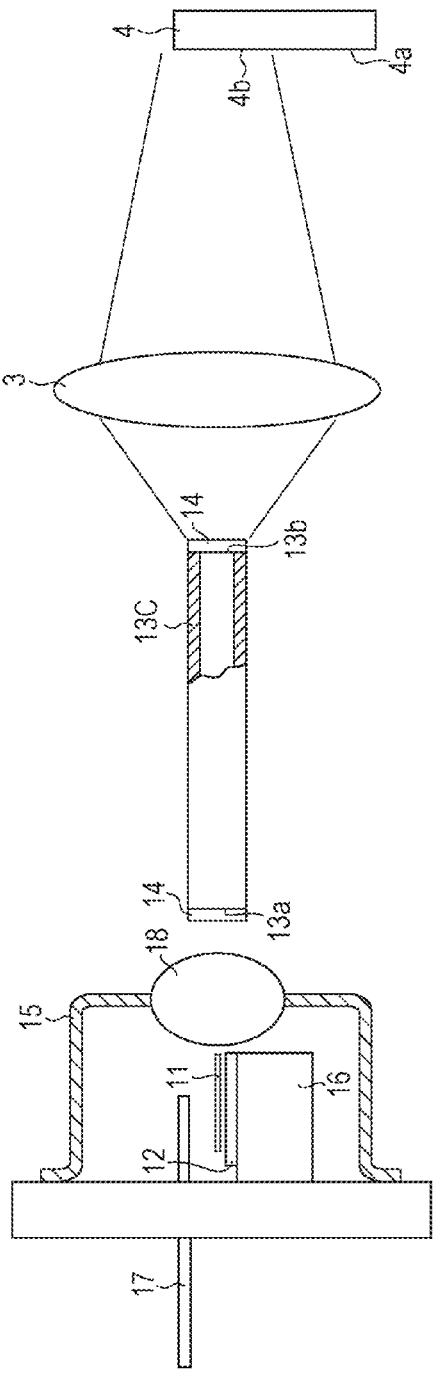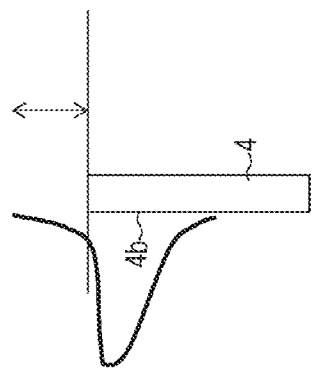

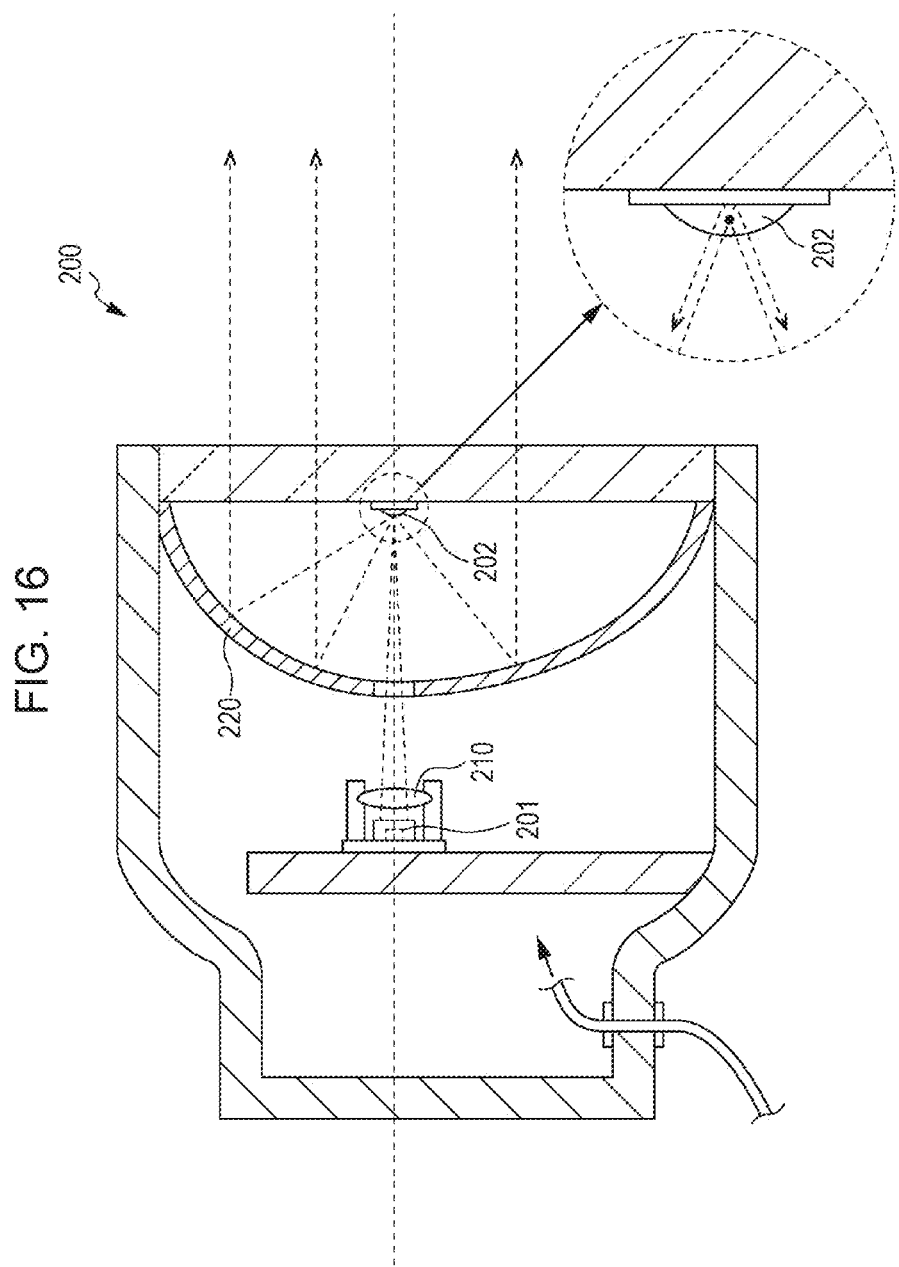

LIGHT-EMITTING DEVICE, VEHICLE HEADLAMP AND ILLUMINATION APPARATUS

REFERENCE TO RELATED APPLICATIONS

This nonprovisional application claims priority under 35U.S.C. §119 on Japanese Patent Application No. 2012-187038 filed on Aug. 27, 2012, the entire contents of which are hereby incorporated by reference.

BACKGROUND OF THE INVENTION

1. Field of the Invention

The present invention relates to a light-emitting device, a vehicle headlamp, and an illumination apparatus, each of which radiates illumination light in a desired projection pattern.

2. Description of the Related Art

In recent years, research on light-emitting devices is becoming active, which light-emitting devices each use, as an excitation light source, a semiconductor light-emitting element such as a light-emitting diode (LED) or a laser diode (LD) and use, as illumination light, fluorescent light that a light-emitting section containing a phosphor generates upon irradiation with excitation light emitted from the excitation light source. Such technology is also applied to an illumination apparatus such as a vehicle headlamp.

For example, as shown in FIG. 15, a vehicle headlamp 100 disclosed in Japanese Unexamined Patent Application Publication No. 2011-181381 (published on Sep. 15, 2011) includes a metal plate 111, a phosphor 112 which is arranged on the surface of the metal plate 111 and emits light on excitation by blue laser light, a laser light source (not shown) which radiates the blue laser light which enters the phosphor 112, and a reflection suppressing member 113 which is arranged so as to cover the surface of the metal plate 111 surrounding the phosphor 112 and suppresses the reflection of the blue laser light entering from the laser light source. Accordingly, the vehicle headlamp 100 is configured so as to prevent (or reduce) color irregularities and luminance irregularities of the emitted light which are caused by the blue laser light radiated from the laser light source being reflected by the surface of the metal plate 111 surrounding the phosphor 112.

Furthermore, for example, as shown in FIG. 16, the vehicle headlamp 200 disclosed in Japanese Unexamined Patent Application Publication No. 2005-150041 (published on Jun. 9, 2005) includes a semiconductor light-emitting element 201 which emits light, a phosphor 202 provided separated from the semiconductor light-emitting element 201, a lens 210 which concentrates the light generated by the semiconductor light-emitting element 201 onto the phosphor 202, and a reflecting mirror 220 which has an optical center in a position at which the phosphor 202 is provided and radiates the outside of the vehicle headlamp 200 with the light generated by the phosphor 202 according to the light concentrated thereon by the lens 210. As shown in FIG. 17A, the reflecting mirror 220 includes an inclined reflective surface 221 and a horizontal reflective surface 222. Accordingly, as shown in FIG. 17B, as the low beam projection pattern which is formed on a virtual vertical screen provided in a position 25 m in front of the vehicle headlamp 200, a projection pattern 230 is formed which includes a horizontal cutoff line 231 for determining the light-dark boundary in a substantially horizontal direction, and an inclined cutoff line 232 for determining the light-dark boundary in a predetermined inclined direction at an angle of approximately 15° in relation to the horizontal direction. The reflecting mirror 220 is a mirror which is referred to as a multifaceted mirror.

In addition, for example, as shown in FIGS. 18A and 18B, the fiber optic illumination apparatus 300 disclosed in Japanese Unexamined Patent Application Publication No. 2009-043668 (published on Feb. 26, 2009) includes a semiconductor laser 310 which emits excitation light 301, a single fiber 320 which acts as a waveguide for the excitation light 301 emitted from the semiconductor laser 310, a phosphor unit 330 which receives the excitation light 301 emitted from the single fiber 320 and emits fluorescent light of a different wavelength from that of the excitation light 301, and a fiber bundle 340 which acts as a waveguide for at least a portion of the fluorescent light emitted from the phosphor unit 330. The fiber optic illumination apparatus 300 further includes a reflector 350 which reflects, of the reflected scattered light generated by the phosphor unit 330 and the fluorescence emitted from the phosphor unit 330, at least a portion of the light which does not directly enter the entrance region of the fiber bundle 340 toward the entrance region of the fiber bundle 340.

However, in the light-emitting device, the vehicle headlamp and the illumination apparatus of the related art, there is a problem in that the projection efficiency decreases due to a loss of illumination light.

Specifically, in the vehicle headlamp 100 disclosed in Japanese Unexamined Patent Application Publication No. 2011-181381, in order to obtain a projection pattern with a clear edge, the surface of the metal plate 111 surrounding the phosphor 112 is covered with the reflection suppressing member 113. As a result, a portion of the blue laser light entering from the laser light source is shielded. Therefore, the projection efficiency decreases due to a loss of illumination light. In addition, stray light caused by scattering on the surface of the metal plate 111 causes the contrast at the edge to deteriorate. Furthermore, according to optical absorption at the metal plate 111, there is a problem in that the temperature of the metal plate 111 increases, thereby influencing the properties of the phosphor 112, such as changes in chromaticity and intensity.

In addition, in the vehicle headlamp 200 disclosed in Japanese Unexamined Patent Application Publication No. 2005-150041, a multifaceted mirror is used for the reflecting mirror 220. As a result, it is difficult to obtain a projection pattern with a clear edge using a multifaceted mirror, and further, a large reflecting mirror 220 is necessary. Furthermore, there is also a problem in that stray light enters unnecessary regions such as vacancies, that is, the efficiency decreases.

Meanwhile, in order to prevent the loss of illumination light, the fiber optic illumination apparatus 300 disclosed in Japanese Unexamined Patent Application Publication No. 2009-043668 includes a reflector 350 in order to cause, of the reflected scattered light generated by the phosphor unit 330 and the fluorescence emitted from the phosphor unit 330, at least a portion of the light which does not directly enter the entrance region of the fiber bundle 340 to enter the entrance region of the fiber bundle 340. However, since the disclosure of the fiber optic illumination apparatus 300 disclosed in Japanese Unexamined Patent Application Publication No. 2009-043668 only relates to application to an endoscope, there is no mention of application to a projection pattern. Accordingly, the disclosure is insufficient for application to a vehicle headlamp.

SUMMARY OF THE INVENTION

Accordingly, it is an object of the present invention to provide a light-emitting device, a vehicle headlamp, and an illumination apparatus, each of which can efficiently form a clear edge on a light-emitting section, that is, can efficiently form a clear edge of a projection pattern on a projection surface.

According to an embodiment of the present technology, there is provided a light-emitting device including a light-emitting element which emits excitation light; a light-emitting section containing a phosphor; and an optical guide member, in which the excitation light emitted from the light-emitting element is optically guided by the optical guide member, the light output from the optical guide member enters the light-emitting section, and an edge is present in a light intensity distribution of the light-emitting section. Furthermore, ideally, the term "edge" refers to discontinuous light intensity distribution. However, in the present application, the term "edge" refers to a light intensity distribution of a light intensity attenuation profile which is harsher than a light intensity attenuation profile in which the light intensity distribution is a Gaussian distribution. Specifically, the term "edge" refers to a case in which the interval between the position of 80% of the peak light intensity and the position of $1/(e^2)$ of the peak light intensity is an interval of ½ or less the full width at half maximum.

According to an embodiment of the technology described above, the excitation light emitted from the light-emitting element enters the optical guide member, is optically guided by the optical guide member, and further, the light output from the optical guide member enters the light-emitting section.

Here, in the related art, in order to form a clear edge of the projection pattern on the projection surface, to obtain a desired projection pattern, the light-emitting section is shielded in a similar shape to that of the desired projection pattern, or the projection surface is irradiated via a multifaceted mirror. As a result, there is a problem in that there is a loss of illumination light.

In an embodiment of the present technology, in order to solve the problem, an edge is present in the light intensity distribution of the light-emitting section.

In other words, for example, even if a portion of the light intensity distribution in the light output from the optical guide member is a general Gaussian distribution, when the optical guide member includes a portion (an edge) in which the light intensity drops discontinuously, it is possible to form a clear edge of an irradiation pattern on the irradiation surface of the light-emitting section.

Accordingly, for example, a portion (an edge) at which the light intensity drops discontinuously is matched with the edge of an end portion of a portion of the projection pattern on the projection surface. Therefore, it is possible to form a clear edge at the end portion of a portion of the projection pattern on the projection surface.

Accordingly, it is possible to provide a light-emitting device which can efficiently form a clear edge on the light-emitting section, that is, can efficiently form a clear edge of the projection pattern on the projection surface.

In the light-emitting device of an embodiment of the present technology, in order to project, by irradiation, the edge present in the light intensity distribution of the light-emitting section, it is preferable that an edge be present in the light intensity distribution on an exit end surface of the optical guide member.

Accordingly, it is possible to project, by irradiation, the edge in the light intensity distribution of the light-emitting section.

In the light-emitting device of an embodiment of the present technology, it is preferable that an irradiation region of the light output from the optical guide member which enters the light-emitting section be smaller than an external form of the light-emitting section. Furthermore, the "irradiation region" which radiates the light-emitting section refers to the area of the region of the irradiation pattern, which is the area of the region having a light intensity of $1/(e^2)$ or more in the peak light intensity in the irradiation pattern. It is possible to obtain the irradiation pattern by performing a measurement of the light intensity distribution in the light-emitting section using a CCD camera or the like. In addition, the "irradiation pattern" refers to the light intensity distribution of a laser beam, which is formed in the light-emitting section by the laser beam which has passed through the optical guide member.

Accordingly, in an embodiment of the present technology, approximately all of the light output from the optical guide member enters the region (the approximate irradiation region) of a portion of the light-emitting section and serves as the irradiation pattern. Furthermore, fluorescence from the region (the approximate irradiation region) of a portion of the light-emitting section is emitted to the projection surface to form the projection pattern.

As a result, in the light-emitting section, it is possible to use all of the light output from the optical guide member, thus, the efficiency is favorable.

Accordingly, it is possible to provide a light-emitting device which can efficiently form a clear edge on the light-emitting section, that is, can efficiently form a clear edge of the projection pattern on the projection surface.

Furthermore, in this case, the projection patterns is larger than the irradiation pattern received by the light-emitting section due to the influence of the wave guide and the like of the fluorescence within the light-emitting section. Thus, the term "approximate irradiation region" is used.

In the light-emitting device of an embodiment of the present technology, it is preferable that the thickness of the light-emitting section be ½ or less of the full width at half maximum of the light intensity distribution of the light-emitting section.

Accordingly, it is possible to prevent a decrease in the contrast of the projected edge.

In the light-emitting device of an embodiment of the present technology, it is possible to provide the optical guide member and the light-emitting section separated from one another.

Accordingly, it is possible to provide the light-emitting section separately from the optical guide member and to improve the freedom of installation positioning of the light-emitting section.

In the light-emitting device of an embodiment of the present technology, the optical guide member may have an adjusted refractive index distribution so as to control the light intensity distribution in an exit end surface of the optical guide member.

In other words, since the light optically guided through the inner portion of the optical guide member is focused on a portion which has a high refractive index, it is possible to increase the light intensity of the light output from the optical guide member in the portion which has a high refractive index. Accordingly, it is possible to control the light distribution profile of the irradiation pattern by adjusting the refractive index distribution of the optical guide member. That is, it is possible to form a clear edge of the projection pattern on the projection surface.

In the light-emitting device of an embodiment of the present technology, the optical guide member may be formed of a multimode fiber.

In other words, an optical fiber is configured by a three layered structure which consists of a core, a portion outside the core referred to as cladding, and a sheath which covers the core and the cladding. Further, by raising the refractive index of the core higher than that of the cladding, this structure propagates light, as much as possible, only in the core, which is the central portion, due to total internal reflection, refraction and the like. The optical fiber is divided into modes according to the path of the light which propagates through the optical fiber. In other words, a fiber in which the light takes one path (has one group velocity and one mode) is a single mode fiber, and any other fiber is a multimode fiber. In comparison with a single mode fiber, a multimode fiber is characterized in that it has a thick diameter, thereby making it resistant to bending, it is comparatively easy to connect the optical fibers to one another, and to connect the optical fibers to equipment, the multimode fiber is not suitable for long distance transmission since transmission losses and the like are great, however the multimode fiber is inexpensive.

As a result, for example, by forming the optical guide member as a multimode fiber, costs are reduced in comparison with using something other than an optical fiber, and it is possible to lengthen the optical guide distance. Therefore, there are merits to using a multimode fiber in cases such as when the distance from the light-emitting element to the light-emitting section is long and when the two may not be connected in a straight line.

Accordingly, in a case in which the light-emitting device is used for a vehicle headlamp, it is possible to arrange the light-emitting element in a space which is vacant in the inner portion of the bonnet of the vehicle, thereby increasing the design freedom.

In addition, the multimode fiber also has a merit in that there is a great design freedom in the light distribution of the fiber output end.

In order to solve the above problems, the vehicle headlamp of an embodiment of the present technology is provided with the light-emitting device described above, in the light-emitting section, fluorescence is emitted by the phosphor on the basis of the irradiation pattern of the light intensity distribution in which an edge is present, and the fluorescence is projected onto the projection surface as the projection pattern. Furthermore, the "projection pattern" refers to the light intensity distribution on the projection surface, which is the light intensity distribution emitted by the light-emitting section. In addition, the projection surface refers to a virtual surface for viewing the projection pattern.

According to an embodiment of the technology described above, it is possible to adapt the light distribution profile of the illumination light of the vehicle headlamp to the light distribution profile of the vehicle headlamp for passing or the like as stipulated by the law.

Accordingly, it is possible to provide a vehicle headlamp which includes the light-emitting device which can efficiently form a clear edge of the projection pattern on the projection surface.

In order to solve the above problems, the illumination apparatus of an embodiment of the present technology is provided with the light-emitting device described above, in the light-emitting section, fluorescence is emitted by the phosphor on the basis of the irradiation pattern of the light intensity distribution in which an edge is present, and the fluorescence is projected onto the projection surface as the projection pattern.

According to the above embodiment of the present technology, it is possible to provide an illumination apparatus which includes the light-emitting device which can efficiently form a clear edge of the projection pattern on the projection surface.

As described above, in the light-emitting device of an embodiment of the present technology, an edge is present in the light intensity distribution of the light-emitting section.

As described above, the vehicle headlamp of an embodiment of the present technology is provided with the light-emitting device described above, in the light-emitting section, fluorescence is emitted by the phosphor on the basis of the irradiation pattern of the light intensity distribution in which an edge is present, and the fluorescence is projected onto the projection surface as the projection pattern.

As described above, the illumination apparatus of an embodiment of the present technology is provided with the light-emitting device described above, in the light-emitting section, fluorescence is emitted by the phosphor on the basis of the irradiation pattern of the light intensity distribution in which an edge is present, and the fluorescence is projected onto the projection surface as the projection pattern.

Accordingly, the effect is achieved that a light-emitting device, a vehicle headlamp and an illumination apparatus are provided, each of which efficiently forms a clear edge on the light-emitting section, that is, efficiently forms a clear edge of the projection pattern on the projection surface.

BRIEF DESCRIPTION OF THE DRAWINGS

FIG. 4A is a distribution map illustrating the light intensity distribution formed from an ideal Gaussian distribution.

FIG. 4B is a distribution map illustrating the light intensity distribution in which the top width of the light intensity distribution is great.

FIG. 7 is a cross-sectional view illustrating the schematic configuration of a modification example of the headlamp.

FIG. 8 is a cross-sectional view illustrating the schematic configuration of another modification example of the headlamp.

FIG. 9 is a cross-sectional view illustrating the schematic configuration of yet another modification example of the headlamp.

FIG. 14A is a cross-sectional view illustrating the light which enters the light-emitting section in the headlamp in which the laser chip and the optical rod are provided separated from one another.

FIG. 14B is a distribution map illustrating the light intensity distribution in the exit end surface of the optical rod.

FIG. 14C is a distribution map illustrating the light intensity distribution in the illumination surface of the light-emitting section.

FIG. 16 is a cross-sectional view showing the configuration of the vehicle headlamp of the related art.

DESCRIPTION OF THE PREFERRED EMBODIMENTS

Below, an embodiment of the present technology will be described in detail with reference to FIG. 1A to FIG. 14C.

In the present embodiment, description will be given using the headlamp, which serves as the vehicle headlamp which satisfies the light distribution characteristics of a headlamp for passing (a low beam) for an automobile provided with the light-emitting device of an embodiment of the present technology, as an example. However, the light-emitting device of an embodiment of the present technology is not necessarily limited thereto. Further, for example, the light-emitting device may also be realized as a driving headlamp (a high beam), or as a headlamp of a vehicle or a moving object other than the automobile (for example, a person, a ship, an airplane, a submarine, a rocket, or the like), or can also be realized as an illumination apparatus for other applications.

The examples of such an illumination apparatus for other applications include a search light, a projector, a household illumination apparatus, a commercial illumination apparatus, and an exterior illumination apparatus.

Here, in the present specification, the "projection pattern" refers to the light intensity distribution on the projection surface, which is the light intensity distribution emitted by the light-emitting section. In addition, the projection surface refers to a virtual surface for viewing the projection pattern.

Configuration of Headlamp

Figure 1:
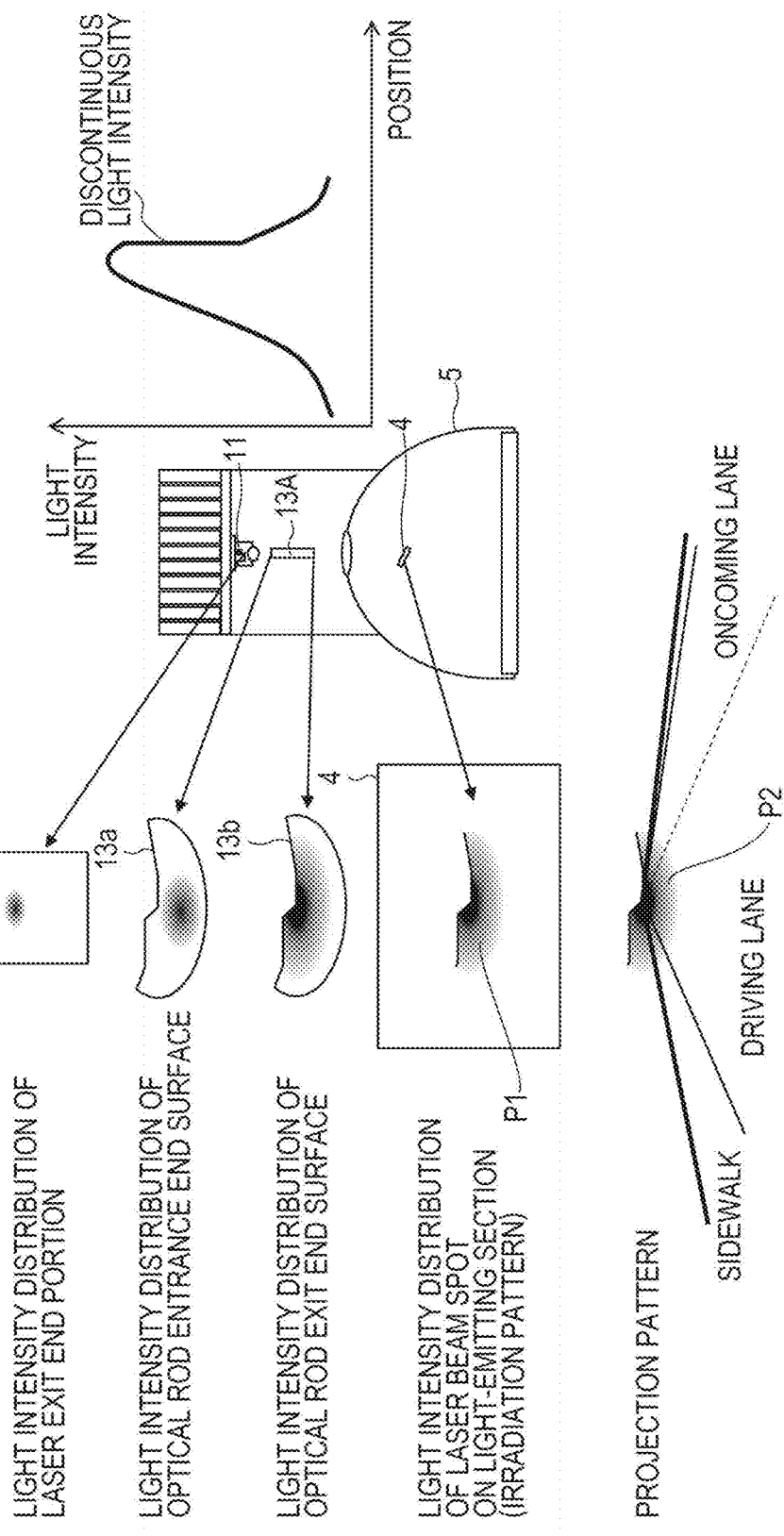
FIG. 1A is a front view illustrating an embodiment of the headlamp which serves as the vehicle headlamp which includes the light-emitting device according to an embodiment of the present technology, and illustrating the light intensity distribution of each of the exit end surface of the laser chip, the entrance end surface of the optical guide member, the exit end surface of the optical guide member, and the entrance surface and projection surface of the light-emitting section in the headlamp.
FIG. 1B is a view illustrating the light intensity distribution which has a portion (an edge) at which the light intensity drops discontinuously due to the excitation light emitted from the laser chip, where the excitation light has a substantially Gaussian distribution, passing through the optical guide member and entering the light-emitting section.
Figure 2:
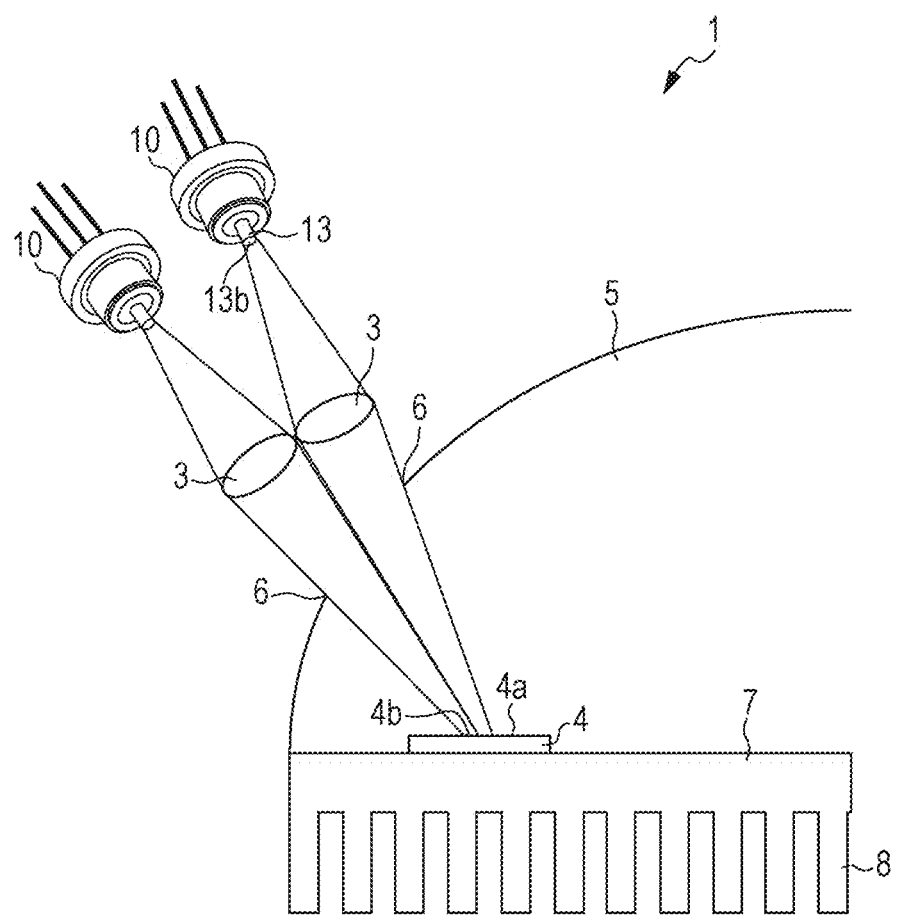
FIG. 2 is a schematic configuration diagram illustrating the entirety of the headlamp.

First, the configuration of the headlamp which serves as the vehicle headlamp of the present embodiment will be described with reference to FIG. 2. FIG. 2 is a schematic configuration diagram illustrating the entirety of the headlamp.

As illustrated in FIG. 2, the headlamp 1 of the present embodiment includes light source sections 10, lenses 3, a light-emitting section 4, a parabolic mirror 5, a metal base 7, and a fin 8.

The headlamp 1 is configured such that the light-emitting section 4 generates fluorescence by being irradiated with excitation light emitted from the light source sections 10. The fluorescence is used as the illumination light.

Light Source Section

The light source sections 10 include a light-emitting element which emits excitation light. For example, in the present embodiment, a semiconductor laser is used as the light-emitting element. Furthermore, the light-emitting element is not limited thereto, and an LED may also be used. However, since the semiconductor laser couples light with the optical rod 13A, which serves as the optical guide member, more efficiently than the LED, it is preferable to use a semiconductor laser as the excitation light source.

The headlamp 1 may include a plurality of the light source sections 10. In this case, each of the plurality of light source sections 10 radiates a laser beam which serves as the excitation light. The number of the light source sections 10 used may be only one, but it is preferable to use a plurality of the light source sections 10 in order to obtain a high-power laser beam. Furthermore, in FIG. 2, two sets of the light source section 10 and the lens 3 are provided, however, it is also sufficient to provide only one set. In addition, in FIG. 2, each set of the light source section 10 and the lens 3 radiates light onto different locations of the light-emitting section 4, however, the set may also be set so as to radiate the same location.

Furthermore, the light source section 10 may have one light-emitting point in a single chip, or a plurality of light-emitting points in a single chip. The wavelength of a laser beam of the light source section 10 is, for example, 395 nm (blue-violet) or 450 nm (blue). However, the wavelength is not limited to these. It is only necessary to select the wavelength as appropriate, such as 405 nm, depending on the type of phosphor to be included in the light-emitting section 4. Furthermore, the light source section 10 will be described in detail later.

Lens

The lens 3 condenses a laser beam output from the optical rod 13A of the light source section 10 and the light-emitting section 4 is irradiated with the laser beam. The lens 3 controls the spot size of a laser beam.

By providing the lens 3, it is possible to cause an exit end surface 13b, which serves as the exit end surface of the optical guide member of the optical rod 13A, and a laser beam spot 4b, which serves as the irradiation region of the excitation light radiated onto the light-emitting section 4, to be optically conjugate with one another. Therefore, it is easy to control the spot size of the laser beam spot 4b of the excitation light radiated onto the light-emitting section 4.

By changing the design of a curved surface of the lens 3 or changing the distance between the lens 3 and the light-emitting section 4, it is possible to change the spot size of the laser beam on a laser beam irradiation surface 4a of the light-emitting section 4.

For example, the lens 3 is a convex lens. The lenses 3 are arranged corresponding to each of the light source sections 10, and the positional relationship between the exit end surfaces 13b, the lenses 3 and the light-emitting section 4 is defined such that the exit end surfaces 13b and the laser beam spots 4b of the excitation light radiated onto the light-emitting section 4 are substantially optically conjugate with one another.

Furthermore, the lens 3 may be changed for a concave mirror or the like, for example. In addition, the lens 3 may also be a multi-element lens using a plurality of lenses, and may also contain a prism, a mirror, a cube, or the like for controlling the optical path. In other words, the lens 3 is not particularly limited, as long as it is capable of controlling a spot size of a laser beam.

Light-Emitting Section

The light-emitting section 4 emits fluorescence upon receiving a laser beam output from the light source section 10, and contains a fluorescent material which emits light upon receiving a laser beam. Specifically, the light-emitting section 4 is obtained by dispersing a phosphor in the inner portion of a resin layer. The light-emitting section 4 converts a laser beam into fluorescence. Therefore, the light-emitting section can be regarded as a wavelength conversion element.

The light-emitting section 4 is arranged on the metal base 7 and substantially at a focal point of the parabolic mirror 5. Therefore, the fluorescence emitted from the light-emitting section 4 is reflected by a reflective curved surface of the parabolic mirror 5, thereby the optical path of the fluorescence is controlled. An antireflection structure which prevents the reflection of a laser beam may also be provided on the laser beam irradiation surface 4a of the light-emitting section 4.

In the present embodiment, such that the light-emitting section 4 emits a white spontaneous emission light (fluorescence) upon receiving a laser beam of a 395 nm wavelength radiated by a laser chip 11 which serves as the light-emitting element, a plurality of types of phosphor such as BAM ($BaMgAl_{10}O_{17}$:Eu), BSON ($Ba_3Si_6O_{12}N_2$:Eu), and Eu-α (Ca-α-SiAlON:Eu) are mixed together and used as the phosphor of the light-emitting section 4. However, the phosphor is not limited thereto. For example, when the headlamp 1 is used for an automobile, the phosphor may be selected as appropriate such that the illumination light of the headlamp 1 is a white which contains chromaticity of a predetermined range stipulated by the law. In addition, when the headlamp 1 is used for illumination or the like, in order to output the necessary color as appropriate, a single phosphor may also be used alone, or a plurality of types of phosphor may also be mixed as appropriate and used.

For example, it is possible to use another oxynitride phosphor (for example, sialon phosphors such as JEM (LaAl($SiAl)_6N_9$O:Ce), and β-sialon phosphor), a nitride phosphor (for example, CASN ($CaAlSiN_3$:Eu) phosphor, and SCASN ((Sr, Ca)$AlSiN_3$:Eu) phosphor), an Apataite ((Ca, Sr)$_5$($PO_4$)$_3$Cl:Eu) system, A Silicate ((Ba, Sr, Mg)$_2SiO_4$:Eu, Mn) system phosphor, or a group III-V compound semiconductor nanoparticle phosphor (for example, indium phosphide: InP).

For example, when blue, green, and red phosphors are included in the light-emitting section 4 and these phosphors are irradiated with a 395 nm laser beam, white light is generated. Alternatively, it is possible to obtain white light by providing a yellow phosphor (or green and red phosphors) in the light-emitting section 4 and radiating the light-emitting section 4 with a 450 nm (blue) laser beam (or a laser beam of so-called "close to blue" which has a peak wavelength falling within a wavelength range from 440 nm to 490 nm).

The resin layer of the light-emitting section 4 is for example a glass material such as an inorganic glass or an organic-inorganic hybrid glass, or a resin material such as a silicone resin. A low-melting glass may be used as the glass material. It is preferable that the resin layer be highly transparent. In a case where a laser beam is high in power, it is preferable that the glass material be highly resistant to heat.

Furthermore, by wave-guiding the fluorescence in a planar direction in the inner portion of the light-emitting section 4, in order to prevent a decrease in the contrast of the projected edge, it is preferable that the light-emitting section 4 be thin. Specifically, it is preferable that the light-emitting section 4 be of a thickness of ½ or less the full width at half maximum of the irradiation pattern (the light intensity distribution) which forms the laser beam irradiation surface 4a of the light-emitting section 4.

Heat Dissipation Section

The metal base 7 is a supporting member in the form of a plate which supports the light-emitting section 4, and is formed from metal such as aluminum or copper, for example. Therefore, the metal base 7 has a high thermal conductivity and is capable of efficiently dissipating heat generated by the light-emitting section 4.

Furthermore, the member which supports the light-emitting section 4 is not limited to those formed from metal, and may also be a member which contains a material other than metal having a high thermal conductivity such as silicon carbide, aluminum nitride or the like, for example. The surface of the metal base 7 which abuts with the light-emitting section 4 may also be a reflective surface. According to the configuration in which the surface is a reflective surface, after a laser beam that has entered the light-emitting section 4 through the laser beam irradiation surface 4a of the light-emitting section 4 is converted into fluorescence, it is possible to cause the fluorescence to be reflected by the reflective surface and to direct the fluorescence toward the parabolic mirror 5. Furthermore, it is necessary to design the reflective surface appropriately so as not to damage the edge.

The fin 8 functions as a cooling section, that is, a heat dissipation structure, which cools the metal base 7. The fin 8 has a plurality of heat dissipating plates, thereby the area in contact with the atmosphere is increased so that heat dissipation efficiency increases. The cooling section which cools the metal base 7 need only include a function of cooling by dissipating heat, and can be of a heat-pipe type, a water-cooling type or an air-cooling type.

Reflector

The parabolic mirror 5 is an example of a projection member which reflects fluorescence generated by the light-emitting section 4 and forms a bundle of rays (illumination light) which travels within a predetermined solid angle. For example, the parabolic mirror 5 may also be a member in which a thin film of metal is formed on the surface thereof, and may also be a member made of metal.

In addition, a reflective surface of the parabolic mirror 5 includes at least a portion of a partial curved surface, which is obtained by rotating a parabola about the symmetric axis thereof so as to form a parabolic surface, and cutting the parabolic surface along a plane including the symmetric axis.

Furthermore, a window section 6 is formed in the parabolic mirror 5. The window section 6 is formed in order to allow the laser beam from the light source section 10 to transmit or pass through the window section 6 of the parabolic mirror 5, since the light source section 10 is arranged outside of the parabolic mirror 5. The window section 6 may also be an opening section, and may also include a transparent member capable of transmitting a laser beam. For example, a transparent plate provided with a filter which transmits a laser beam and reflects white light, which is the fluorescence of the light-emitting section 4, may also be provided as the window section 6. With this configuration, it is possible to prevent the fluorescence of the light-emitting section 4 from leaking out of the window section 6.

One window section 6 shared by a plurality of the light source sections 10 may also be provided, and a plurality of window sections 6 corresponding to each of the light source sections 10 may also be provided.

Furthermore, in addition to the above, the parabolic mirror 5 may also be a projection mirror such as a parabolic mirror which has a closed oval-shaped opening section, and may also be a member containing a parabola shape such as an off-axis parabolic mirror. In addition, it is also possible to use a projection optical system such as one in which an elliptical mirror and a projection lens are combined as the reflector.

Furthermore, the parabolic mirror 5 is characterized in that it is possible to project the irradiation pattern in the light-emitting section 4 to form an edge shape without projection losses by using a projection optical system of a simple shape, as described above. However, this does not exclude the use of a projection optical system such as a multifaceted mirror.

The parabolic mirror 5 need only be an optical system which projects the projection pattern in the light-emitting section 4, and as long as they are appropriately designed, it is possible to use an elliptical shape, a free-form surface shape, a multifaceted multi-reflector, or the like. Furthermore, in this case, there is a case in which the relationship between the irradiation pattern and the projection pattern is not necessarily a simple deformation. However, it is valid to form an edge in the irradiation pattern in order to form an edge in the projection pattern with favorable projection efficiency.

Detailed Description of Light Source Section

Figure 3:
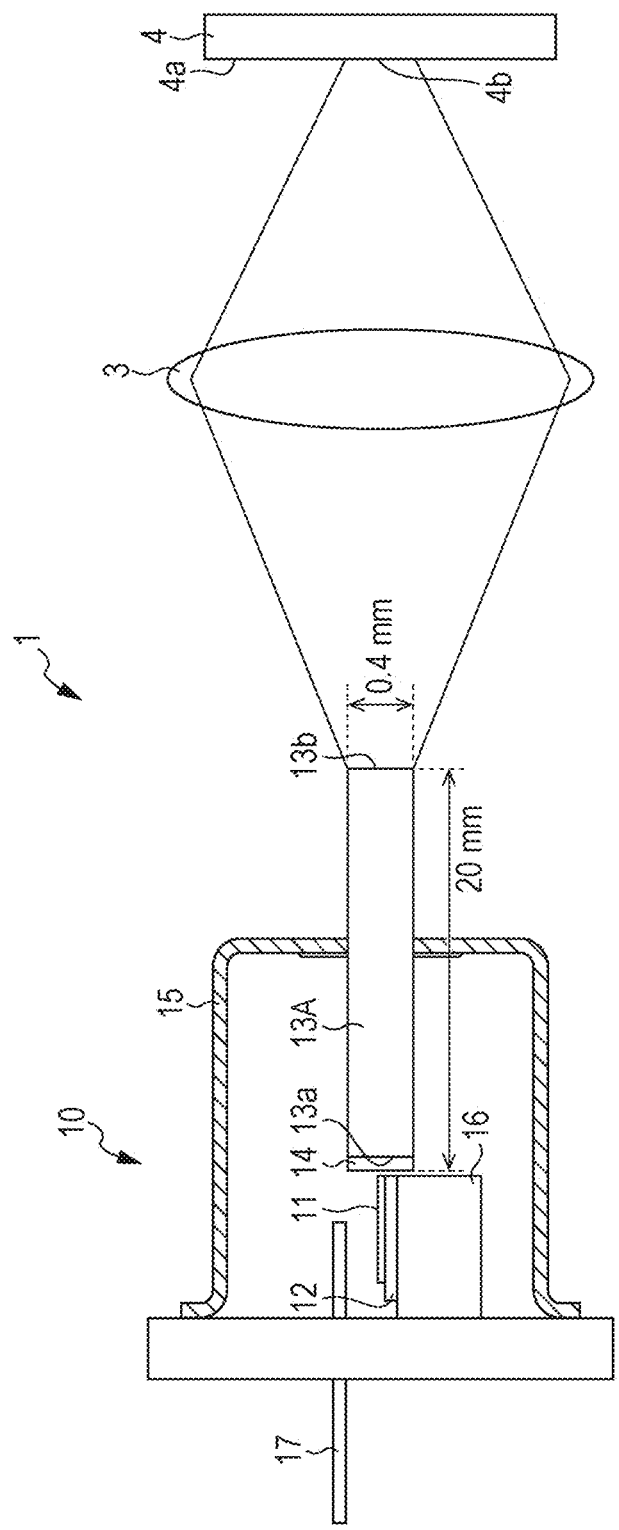
FIG. 3 is a cross-sectional view illustrating the configuration of a light source section in the headlamp.
Figure 5A:
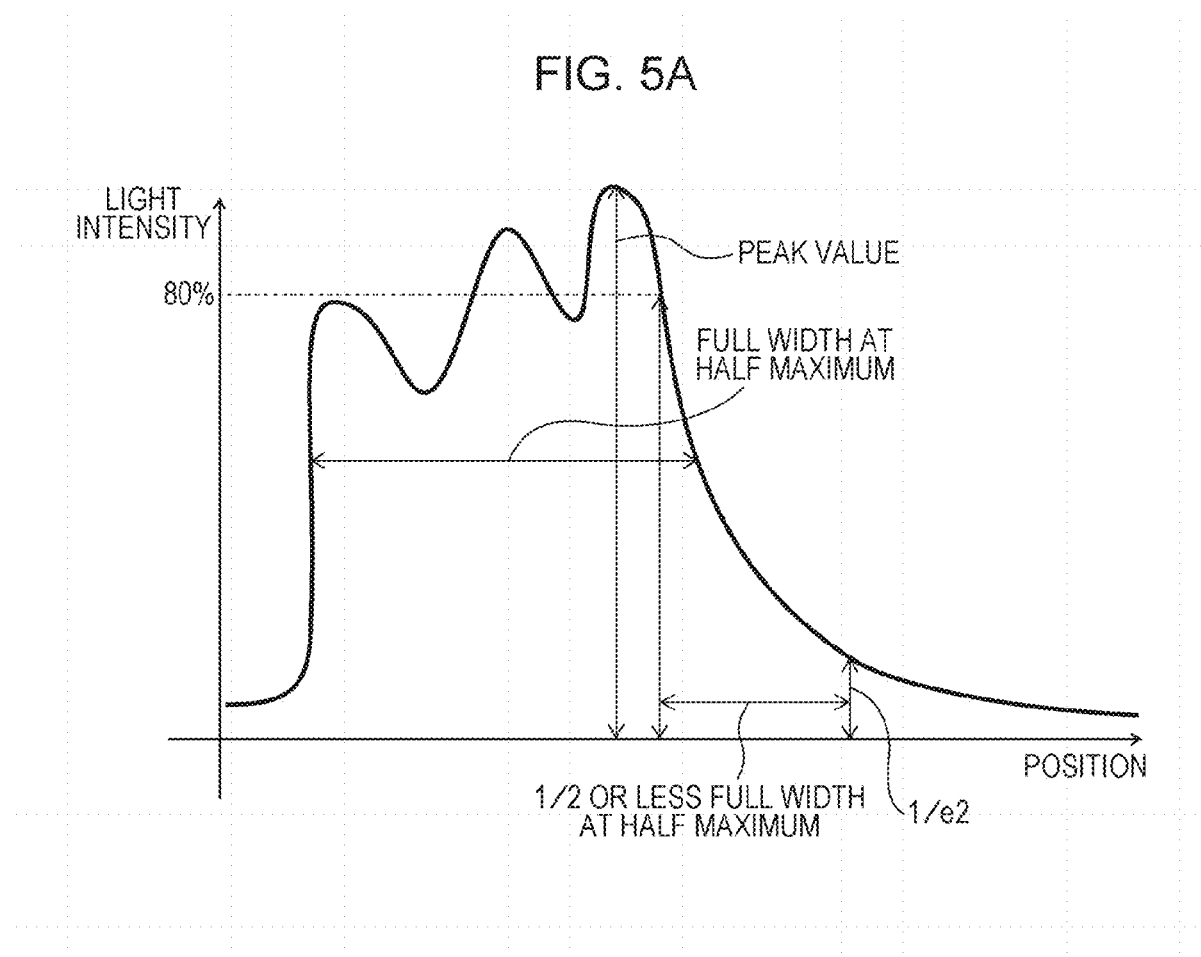
FIG. 5A is a distribution map illustrating the definition of an edge in the light intensity distribution.
Figure 5B:
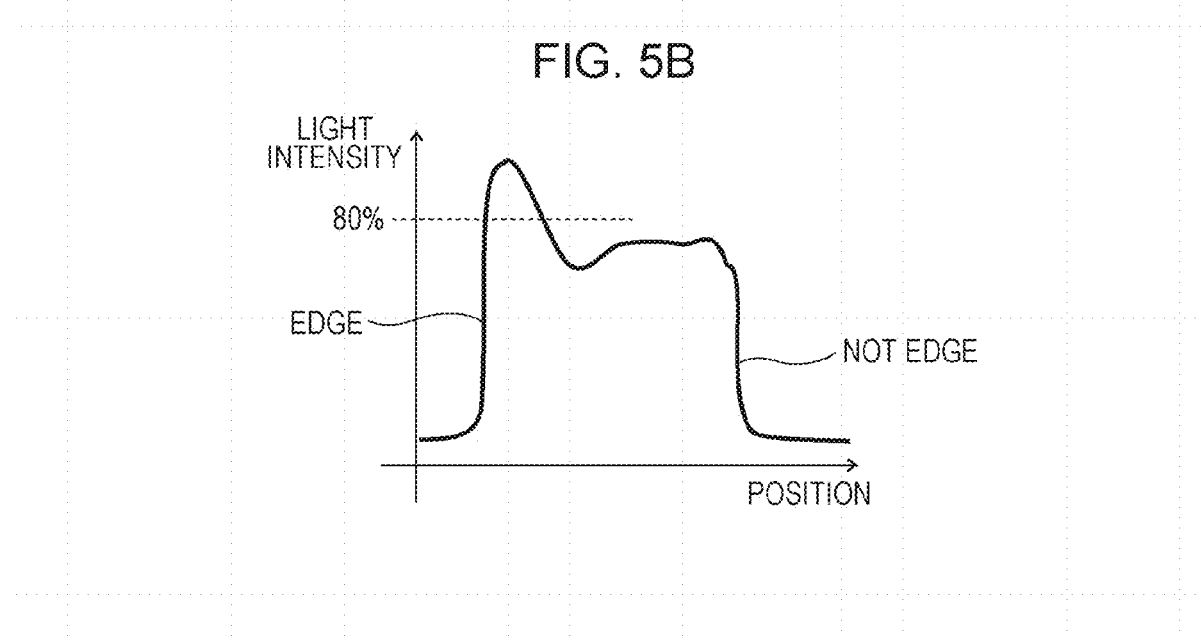
FIG. 5B is a distribution map illustrating an example of a case in which the edge is configured according to the definition, and a case in which the edge is not configured according to the definition.
Figure 6:
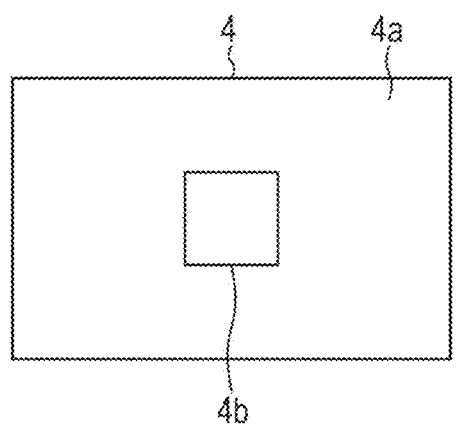
FIG. 6 is a front view illustrating an example of the spot shape of a laser beam on a laser beam irradiation surface of the light-emitting section in the headlamp.
Figure 10A:
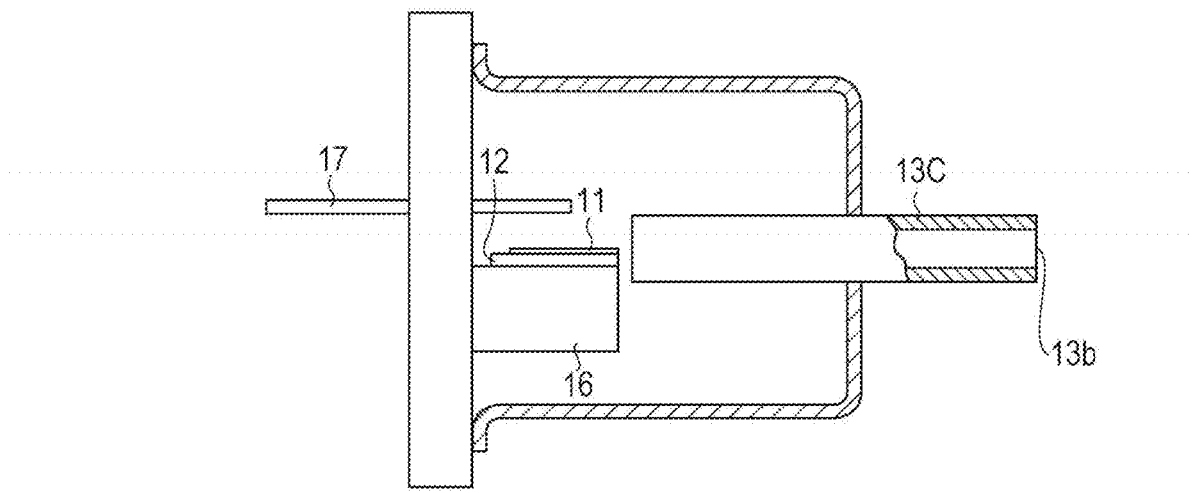
FIG. 10A is a cross-sectional view illustrating the schematic configuration of yet another modification example of the headlamp.
Figure 10B:
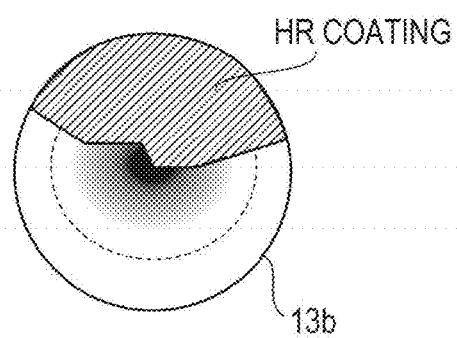
FIG. 10B is a front view illustrating the exit end surface of an optical rod in the headlamp.
Figure 10C:
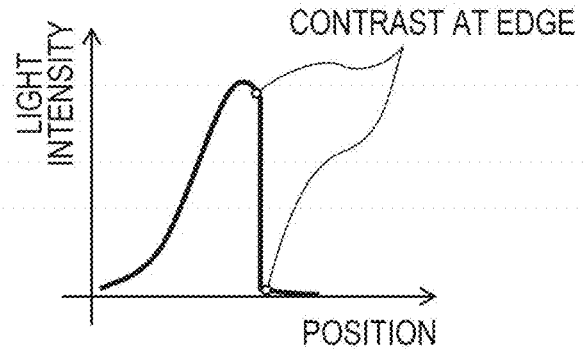
FIG. 10C is a light intensity distribution illustrating the contrast of the edge portion.

Next, the light source section 10 will be described in detail with reference to FIGS. 1A and 1B, and FIGS. 3 to 10C. FIG. 1A is a front view illustrating the light intensity distribution of each of the exit end surface of the laser chip 11, the entrance end surface of the optical guide member, the exit end surface of the optical guide member, and the entrance surface and projection surface of the light-emitting section in the headlamp. FIG. 1B is a view illustrating the light intensity distribution on the irradiation surface of the light-emitting section (a graph of the light intensity distribution (the irradiation pattern) on the irradiation surface of the light-emitting section of FIG. 1A). FIGS. 1A and 1B illustrate that the light intensity distribution includes a portion (an edge) at which the light intensity drops discontinuously due to the excitation light, which is emitted from the laser chip 11 and has a substantially Gaussian distribution, passing through the optical guide member and entering the light-emitting section. FIG. 3 is a cross-section view illustrating the configuration of the light source section 10 in the headlamp 1. FIG. 4A is a distribution map illustrating the light intensity distribution formed from an ideal Gaussian distribution. FIG. 4B is a distribution map illustrating the light intensity distribution in which the top width of the light intensity distribution is great. FIG. 5A is a distribution map illustrating the definition of an edge in the light intensity distribution. FIG. 5B is a distribution map illustrating an example of a case in which the edge is configured according to the definition, and a case in which the edge is not configured according to the definition. FIG. 6 is a front view illustrating an example of spot shape of a laser beam on a laser beam irradiation surface of the light-emitting section in the headlamp. FIG. 7 is a cross-sectional view illustrating the schematic configuration of a modification example of the headlamp. FIG. 8 is a cross-sectional view illustrating the schematic configuration of another modification example of the headlamp. FIG. 9 is a cross-sectional view illustrating the schematic configuration of yet another modification example of the headlamp. FIG. 10A is a cross-sectional view illustrating the schematic configuration of yet another modification example of the headlamp. FIG. 10B is a front view illustrating the exit end surface of an optical rod in the headlamp. FIG. 10C is a light intensity distribution map illustrating the contrast of the edge portion.

As shown in FIG. 3, the light source section 10 includes the laser chip 11 which serves as the light-emitting element, a sub-mount 12, an optical rod 13A, an anti reflection (AR) coating film 14, a cap 15, a stem 16, and a lead terminal 17.

Laser Chip

The laser chip 11 is a semiconductor laser element in the form of a chip, which emits a laser beam serving as excitation light. The laser chip 11 of the present embodiment is a nitride-based semiconductor laser and the oscillation wavelength thereof is 395 nm. However, the laser chip 11 is not limited to a nitride-based semiconductor laser. The laser chip 11 is also not limited to an oscillation wavelength of 395 nm, and, in order to obtain the desired chromaticity, may be appropriately selected according to the relationship between the laser chip 11 and the phosphor material which configures the light-emitting section 4 of the light-emitting section 1 described later.

In addition, the configuration of the laser chip 11, for example, the material of the semiconductor layer is not limited in particular.

Furthermore, the laser chip 11 may have one light-emitting point in a single chip, or a plurality of light-emitting points in a single chip. The oscillation wavelength of the laser beam of the laser chip 11 preferably falls within a range of 365 nm to 470 nm. For example, in addition to the oscillation wavelength of 395 nm of the present embodiment, the oscillation wavelength may be appropriately selected from 405 nm (blue-violet), 450 nm (blue) or the like, depending on the type of phosphor contained in the light-emitting section 4. Furthermore, it is more preferable that the oscillation wavelength of the laser beam of the laser chip 11 fall within a range of 350 nm to 415 nm (the ultraviolet light region).

Sub-Mount

There is a great difference between the thermal expansion coefficient of the laser chip and the thermal expansion coefficient of the stem 16 formed from metal. Therefore, in consideration of a degradation in properties, peeling or the like caused by stress, the laser chip 11 is fixed to a heat dissipation member referred to as the sub-mount 12 using solder, and the sub-mount is further fixed to the stem. For the material of the sub-mount, a material is selected which has a thermal expansion coefficient close to that of the laser chip and has a high thermal conductivity.

The material from which the sub-mount 12 of the present embodiment is configured is AlN. However, the material is not limited thereto. For example, it is possible to use aluminum nitride, SiC, CuW, Cu, diamond, Si, or the like.

Furthermore, when the stem 16 is a ceramic which has a thermal expansion coefficient close to that of the laser chip and is AlN, which has a high thermal conductivity, the submount may be omitted.

Stem

The stem 16 is formed from a core material which contains iron and copper, and the core material is coated with gold. The core material of the stem 16 may also be only copper or iron, and the coating may also be Ag, Pt, PtRd, or the like. In addition, provided that the usage conditions are such that weathering resistance is not a problem, the core material may also be not coated.

In view of the cost and the workability of the members, and exhausting the heat generated by the laser chip 11, it is preferable that the stem 16 is configured by a metal that has high thermal conductivity. However, the stem 16 is not limited to being metal, and may also be a ceramic such as AlN or SiC.

The lead terminal 17 is a terminal for supplying power from an external power supply.

The laser chip 11 is connected with the lead terminal 17 via fine gold wires (not illustrated), and power is supplied from an external power supply via this wiring.

Optical Rod

For example, the optical rod 13A is formed from a transparent material such as glass, acrylic or polycarbonate. Further, the optical rod 13A is an optical member formed from an optical guide member which converts the light intensity distribution of a substantially Gaussian distribution of a laser beam emitted from the laser chip 11 to a predetermined distribution. The optical rod 13A includes an entrance end surface 13a which receives a laser beam, and an exit end surface 13b which emits the laser beam. The entrance end surface 13a is formed at one end portion of the optical rod 13A, and the exit end surface 13b is formed at the other end portion of the optical rod 13A.

The entrance end surface 13a is arranged in the vicinity of a light-emitting point of the laser chip 11. In addition, a laser beam emitted from the light-emitting point enters the optical rod 13A through the entrance end surface 13a. In this case, for example, in order to form an edge, it is considered that the light intensity distribution on the exit end surface 13b of the optical rod 13A be set to a distribution of a top-hat profile. Furthermore, the light which enters the optical rod 13A is not limited to the light from a single laser chip, and may also be the light from a plurality of laser chips. In addition, an optical member such as a lens or a mirror may also be situated between the optical rod 13A and the laser chip.

However, as in the headlamp 1 of the present embodiment, when the light-emitting device is applied to a headlamp for passing (a low beam), it is necessary to form a clear contrast in the upper side of the projection pattern on the projection surface. In addition, illumination in which it is necessary to provide a contrast between light and dark is common, such as illumination which illuminates dangerous elements and the like such that oncoming vehicles do not experience glare, and stage illumination, a representative example of which being a spot light. In other words, as shown in FIG. 10C, at least a portion of the light intensity distribution of the light output from the optical rod 13A includes an edge. Furthermore, the light intensity of the hem of the edge need not necessarily be zero.

Accordingly, as shown in FIG. 1A, a light intensity distribution including an edge on the exit end surface 13b of the optical rod 13A is formed. Further, by projecting this light intensity distribution onto the light-emitting section 4, it is possible to form a clear edge in the irradiation pattern P1. Accordingly, by projecting the irradiation pattern P1, it is possible to form a clear contrast in the projection pattern P2. Furthermore, the irradiation pattern P1 and the projection pattern P2 will be described in detail below.

Here, ideally, the term "edge" refers to a discontinuous light intensity distribution. Accordingly, when there is no edge in the light intensity distribution of the light output from the optical rod 13A, as shown in FIG. 4A, the term "edge" refers to the light intensity distribution continually changing. In this manner, an edge may not be formed with an ideal Gaussian distribution. However, as shown in FIG. 4A, even when the incline of the light intensity is the same as the light intensity distribution, as shown in FIG. 4B, when the top width of the light intensity distribution is great, the incline of the light intensity shown in FIG. 4B corresponds to the edge.

In this manner, the term "edge" refers to a light intensity distribution of a light intensity attenuation profile which is harsher than a light intensity attenuation profile with a Gaussian distribution. However, this edge is influenced by the width of the light intensity distribution. Therefore, in the present embodiment, the term "edge", as shown in FIG. 5A, specifically refers to a case in which the interval between the position of 80% of the peak light intensity and the position of $1/(e^2)$ of the peak light intensity is an interval of ½ or less the full width at half maximum. In other words, it is appropriate to define the edge in relation to the full width at half maximum, in consideration of the width of the light intensity distribution. For example, when the full width at half maximum is taken into consideration, in the light intensity distribution shown in FIG. 5B, the incline of the light intensity on the left side is an edge, but the incline of the light intensity on the right side is not an edge.

Next, as shown in FIG. 3, the exit end portion on which the exit end surface 13b of the optical rod 13A is formed penetrates the cap 15 and extends to the outer portion of the light source section 10, and the positional relationship between the exit end surfaces 13b, the lenses 3 and the light-emitting section 4 is defined such that the exit end surfaces 13b and the laser beam spots 4b of the excitation light radiated onto the light-emitting section 4 are substantially optically conjugate with one another. The numeric aperture NA of the lens is set greater than the numeric aperture NA of the optical rod 13A. Therefore, the excitation light efficiently enters the laser beam irradiation surface 4a in the light-emitting section 4.

In addition, the AR coating film 14 which serves as the antireflection film is provided on the entrance end surface 13a. Accordingly, it is possible to prevent the laser beam from being reflected by the entrance end surface 13a, and therefore it is possible to reduce losses of the laser beam when the laser beam enters the inner portion of the optical rod 13A. The AR coating film 14 may also be provided on the exit end surface 13b. In addition, the AR coating film 14 is an example of the antireflection structure, and another antireflection structure including a moth-eye structure or the like may also be provided on the entrance end surface 13a.

Furthermore, the exit end surface 13b in the optical rod 13A need not necessarily extend to the outer portion of the cap 15 in the light source section 10. The exit end surface 13b may be stored inside the cap 15, and a cap glass which serves as the window which transmits a laser beam from the exit end surface 13b may also be provided in the cap 15. Whether or not to cause the exit end portion which includes the exit end surface 13b to extend to the outer portion of the cap 15 in the light source section 10 depends on the length of the optical rod 13A, the length being necessary for converting a laser beam into light having a light intensity distribution of a predetermined shape.

In the example shown in FIG. 3, the length of the optical rod 13A is 20 mm, for example, and the diameter of the rod is 0.4 mm. However, the size of the optical rod 13A is not limited thereto.

Here, the shape of the exit end surface 13b of the optical rod 13A of the present embodiment is for example, formed in a polygonal shape. Accordingly, for example, the shape of the exit end surface 13b may be, for example, a quadrangle such as a rectangle or a square, that is, the three-dimensional shape of the optical rod 13A may be a quadrangular prism. In this case, as shown in FIG. 6, the shape of the laser beam spot 4b, which serves as the irradiation region on the laser beam irradiation surface 4a of the light-emitting section 4, reflects that of the quadrangle, that is, the rectangle or the square of the exit end surface 13b. As a result, it is possible to change the shape of the laser beam spot 4b to a desired shape by changing the shape of the exit end surface 13b.

Specifically, in the headlamp 1 of the present embodiment, as shown in FIG. 1A, the light distribution profile on the optical rod 13A is projected as the irradiation pattern P1 on the irradiation surface. The irradiation pattern P1 is projected as the projection pattern P2 on the projection surface.

In other words, the irradiation pattern P1 need only be configured such that an end portion of the upper side thereof form the desired edge. Therefore, the shape of the exit end surface 13b of the optical rod 13A also includes a substantially horizontal edge on the upper side thereof. However, it is not demanded that an edge be formed on the lower side of the irradiation pattern P1. Therefore, the refractive index distribution of the optical rod 13A is controlled such that the optical rod 13A can project the desired irradiation pattern P1, thereby controlling the light intensity distribution on the exit end surface 13b of the optical rod 13A. In the present embodiment, the external form of the exit end surface 13b is formed in a substantially elliptical shape. However, the external form of the exit end surface 13b may also be another shape.

In this manner, the shape of the exit end surface 13b of the optical rod 13A of the present embodiment, is a shape corresponding to the light distribution characteristics of a headlamp for passing (a low beam). By employing such a shape for the shape of the exit end surface 13b, it is possible to realize the projection pattern P2 which corresponds to the light distribution characteristics of a headlamp for passing (a low beam).

Figure 11:
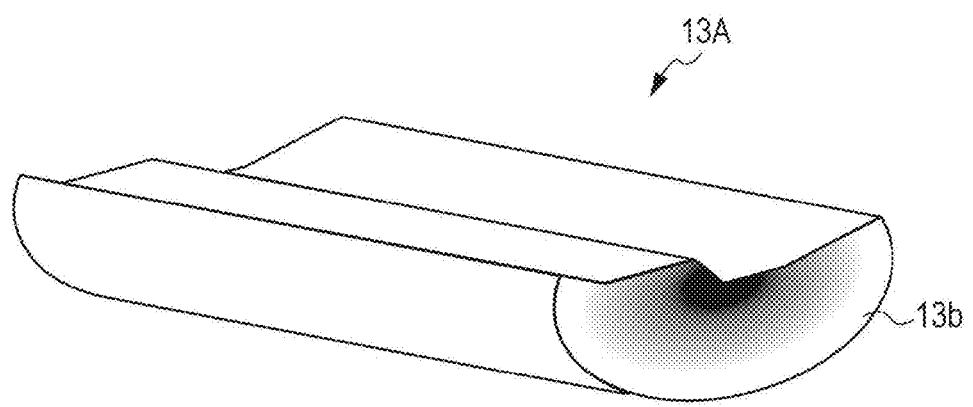
FIG. 11 is a perspective view illustrating the configuration of the optical rod in the headlamp.
Figure 12D:
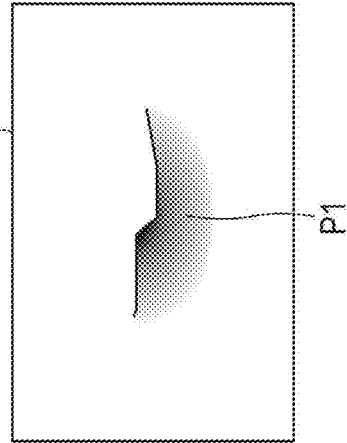
FIGS. 12A to 12D respectively illustrate the light intensity distribution, in the headlamp, of the exit end surface of the laser chip, the entrance end surface of the optical guide member, the exit end surface of the optical guide member and the entrance surface of the light-emitting section.
Figure 12C:
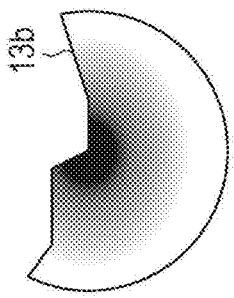
Figure 12B:
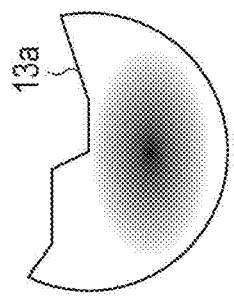
Figure 12A:
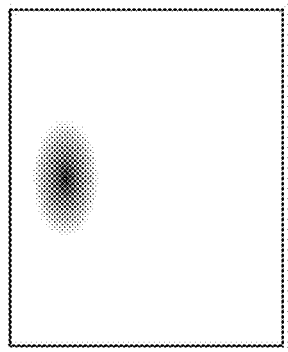

Meanwhile, in FIG. 3 and FIG. 11, the shape of the entrance end surface 13a of the optical rod 13A is the same as the shape of the exit end surface 13b. However, the shapes are not necessarily limited thereto. For example, as shown in FIG. 7, the shape of the entrance end surface 13a side may also be a different shape from that of the exit end surface 13b side. For example, it is possible to adopt a compound parabolic concentrator (CPC) shape (a shape in which the entrance end surface is larger than the light-emitting area of the laser element, and subsequently expands in a substantially parabolic shape in the waveguide direction) for the shape of the entrance end surface 13a side. Accordingly, it is possible to efficiently couple the laser light from the laser chip 11.

In addition, in FIG. 3, the optical rod 13A and the laser chip 11 are both facing and connected to one another. Accordingly, since the laser chip 11 and the optical rod 13A are directly connected to one another, for example, it is not necessary to provide a lens or the like between the laser chip 11 and the optical rod 13A which optically connects the two, and the structure is simple.

However, the configuration is not necessarily limited to this, and as shown in FIG. 8, it is also possible to provide the laser chip 11 and the optical rod 13B separated from one another. Furthermore, in this case, in order to couple the light emitted from the laser chip 11 with the optical rod 13B, it is necessary to provide a coupling lens 18 in the light source section 10. Accordingly, it is possible to provide the light source section 10 including the laser chip 11 separately from the optical rod 13B. As a result, it is possible to improve the freedom of installation positioning of the light source section 10.

In addition, in the present embodiment, the optical rods 13A and 13B are formed from a transparent material such as acrylic or glass. However, they are not limited thereto, and as shown in FIG. 9, it is also possible to adopt an optical rod 13C which is formed from multimode fiber.

In other words, an optical fiber is configured by a three layered structure which consists of a core, a portion outside the core referred to as cladding, and a sheath which covers the core and the cladding. Further, this structure propagates light, as much as possible, only in the core, which is the central portion, due to total internal reflection, refraction and the like. The optical fiber is divided into modes according to the path of the light which propagates through the optical fiber. In other words, a fiber in which the light takes one path (has one group velocity and one mode) is a single mode fiber, and any other fiber is a multimode fiber. In comparison with a single mode fiber, a multimode fiber is characterized in that it has a thick diameter, thereby making it resistant to bending, it is comparatively easy to connect the optical fibers to one another, and to connect the optical fibers to equipment, the multimode fiber is not suitable for long distance transmission since transmission losses and the like are great, however the multimode fiber is inexpensive.

As a result, for example, by employing the optical rod 13C using a multimode fiber, costs are reduced in comparison with using something other than an optical fiber, and it is possible to lengthen the optical guide distance. Therefore, there are merits to using a multimode fiber in cases such as when the distance from the light source section 10 to the light-emitting section 4 is long and when the two may not be connected in a straight line.

Accordingly, in a case in which the light-emitting device is used for the headlamp 1, it is possible to arrange the light source section 10 in a space which is vacant in the inner portion of the bonnet of the vehicle, thereby increasing the design freedom. In addition, the multimode fiber also has a merit in that there is a great design freedom in the light distribution of the fiber output end.

Furthermore, even in a case in which a multimode fiber is used, the light intensity distribution profile of the exit end surface 13b is projected onto the light-emitting section 4 as the irradiation pattern P1, and the light-emitting pattern formed by the irradiation pattern P1 is projected as the projection pattern P2. Furthermore, the refractive index distribution and the core shape of the optical fiber are designed such that it is possible to project the desired projection pattern P2. Further, the clear contrast in the projection pattern 2 is due to the core shape. For example, it is possible to adopt a core diameter of 0.4 mm.

Here, as shown in FIGS. 10A and 10B, in the optical rod 13C using a multimode fiber, it is preferable that the portion at which an edge is to be formed on the exit end surface 13b be treated with a high reflection (HR) coating. Accordingly, as shown in FIG. 10C, the contrast of the edge portion is clearer. Furthermore, it is also possible to treat the portion, which is not treated with the HR coating, with an anti reflection (AR) coating.

Cap

As shown in FIG. 3, the cap 15 is a member for encapsulating or sealing the members such as the laser chip 11. In particular, the relative positions of the laser chip 11 and the optical rod 13A are fixed by the cap 15. The inside of the cap 15 may be hollow, and may also be filled with a material such as resin or low-melting glass. In addition, the entirety of the cap 15 may also be formed from low-melting glass.

Configuration for Forming Clear Contrast of Projection Pattern

In the headlamp 1 of the present embodiment, as shown in FIG. 1A, the excitation light emitted from the laser chip 11 serving as the light-emitting element enters the optical rod 13A serving as the optical guide member. The excitation light is optically guided by the optical rod 13A, and further, the light output from the optical rod 13A enters the light-emitting section 4 in the irradiation pattern P1. Furthermore, in the light-emitting section 4, fluorescence is generated by the phosphor and a light-emitting pattern is formed. The light-emitting pattern is projected by a reflector or the like as the projection pattern P2.

Here, in the related art, in order to form a clear edge of the projection pattern P2 on the projection surface, to obtain a desired projection pattern, the light-emitting section is shielded in a similar shape to that of the desired projection pattern, the projection surface is irradiated via a multifaceted mirror, or the like. As a result, there is a problem in that there is a loss of illumination light.

Figure 13C:
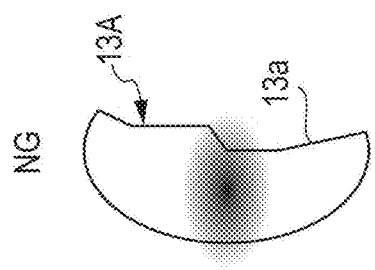
FIG. 13C is a front view of a comparative example illustrating the light distribution of the entrance end surface of the optical guide member.
Figure 13B:
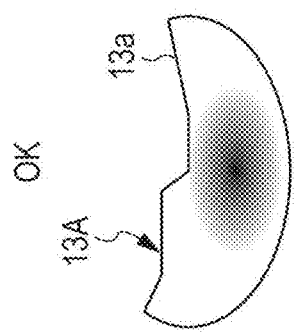
FIG. 13B is a front view illustrating the light distribution of the entrance end surface of the optical guide member.
Figure 13A:
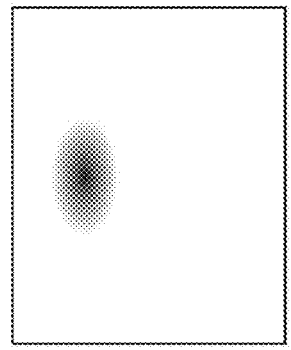
FIG. 13A is a front view illustrating the light distribution of the exit end surface of the laser chip.
Figure 15:
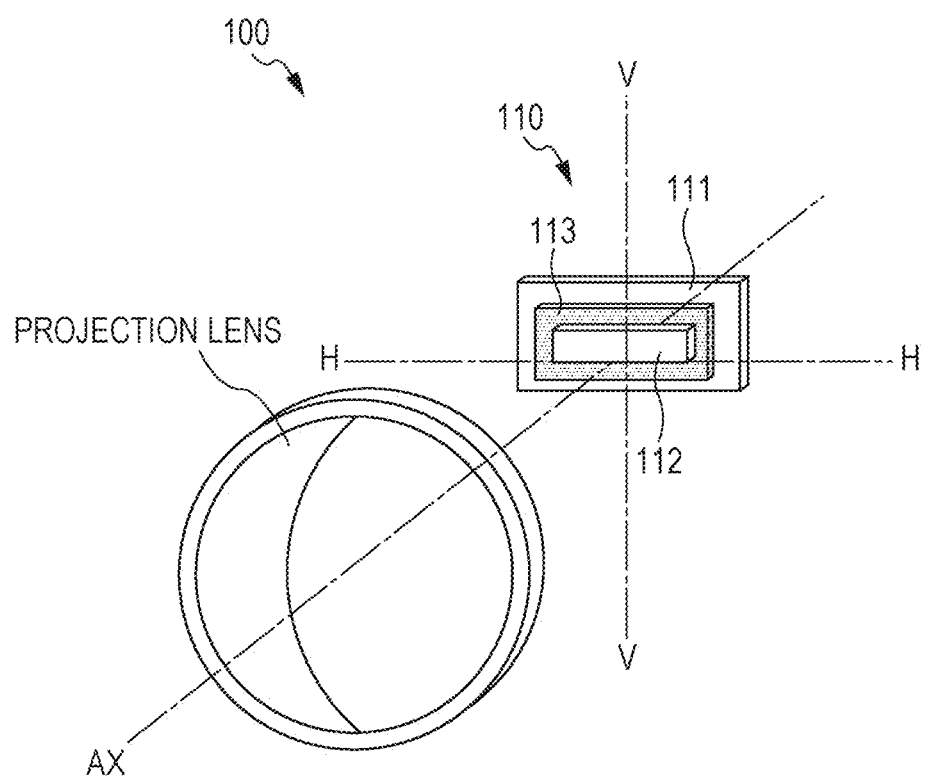
FIG. 15 is a perspective view showing the configuration of the vehicle headlamp of the related art.
Figure 17A:
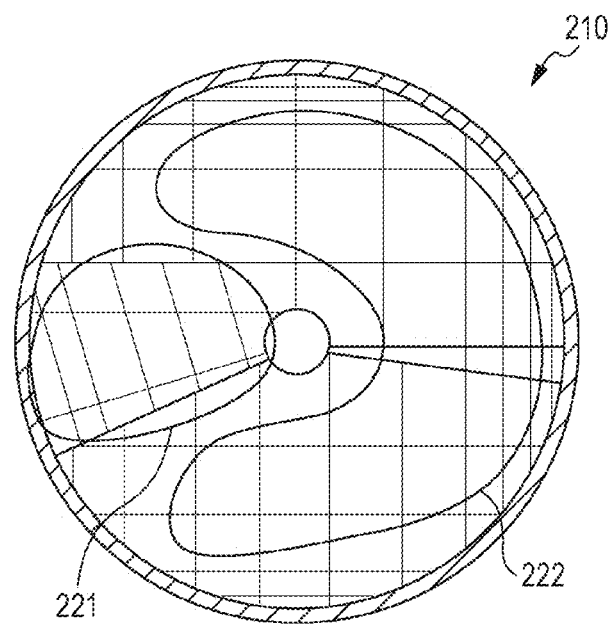
FIG. 17A is a front view illustrating the configuration of a multifaceted mirror provided in the vehicle headlamp of the related art.
Figure 17B:
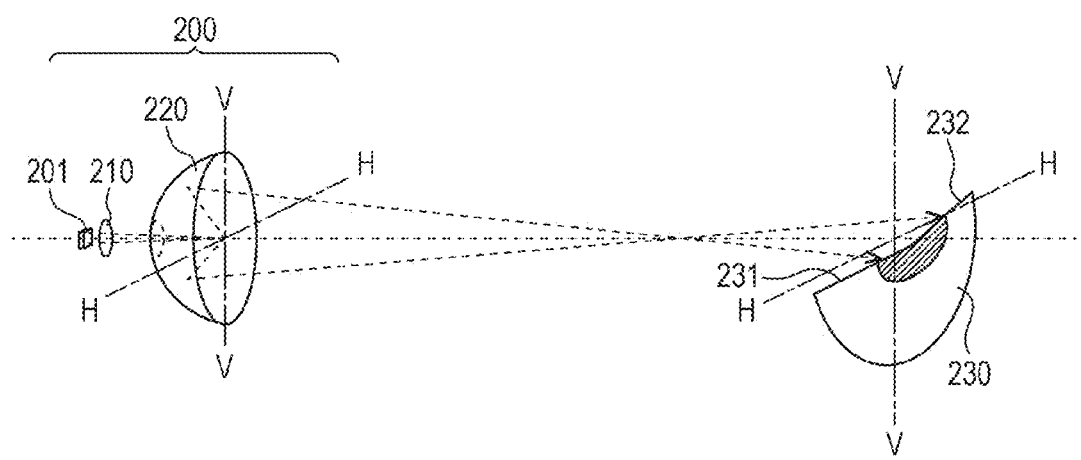
FIG. 17B is a perspective view illustrating the projection pattern of the projection surface of the above vehicle headlamp.
Figure 18A:
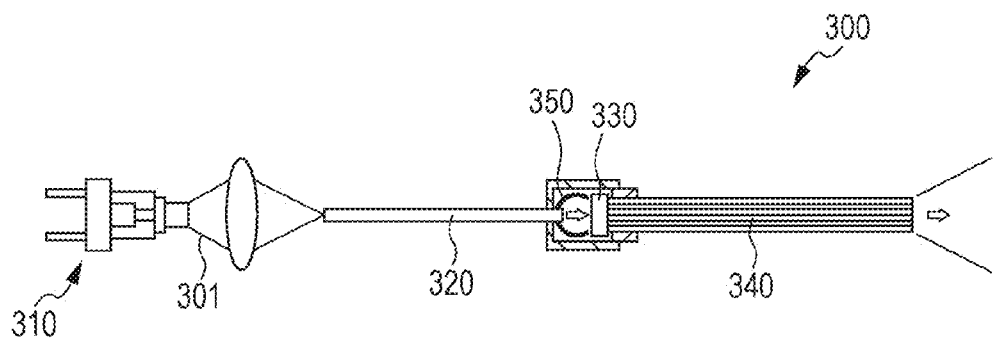
FIG. 18A is a cross-sectional view illustrating the configuration of yet another vehicle headlamp of the related art.
Figure 18B:
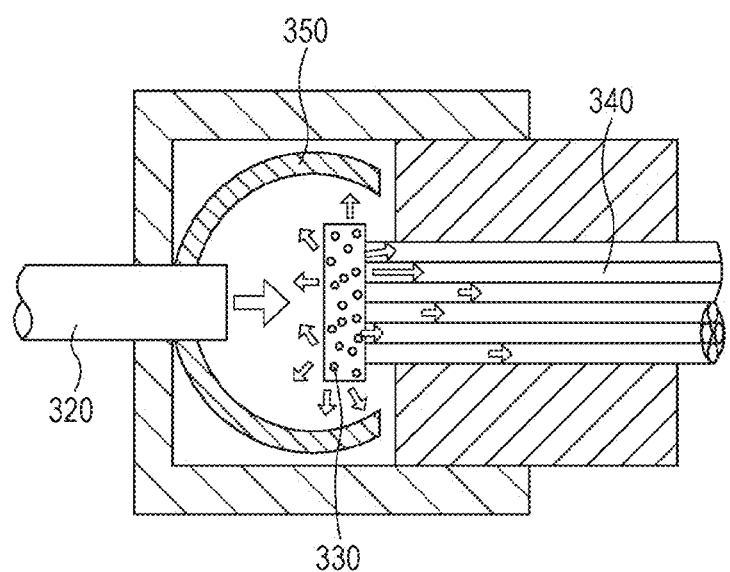
FIG. 18B is a cross-sectional view illustrating the configuration of the light-emitting section of the above vehicle headlamp.

Therefore, in order to solve this problem, the light-emitting device and the headlamp 1 of the present embodiment include the following configurations. These configurations will be described in detail with reference to FIGS. 1A and 1B, FIG. 11, FIGS. 12A, 12B and 12C, FIGS. 13A, 13B and 13C, and FIGS. 14A, 14B and 14C. FIG. 11 is a perspective view illustrating the configuration of the optical rod 13A in the headlamp 1. FIGS. 12A to 12D are front views which respectively illustrate an example of a case in which the light intensity distribution on the exit end surface 13b of the optical rod 13A, and the light intensity distribution on the light-emitting section 4 are not similar. FIG. 13A is a front view illustrating the light distribution of the exit end surface of the laser chip 11. FIG. 13B is a front view illustrating the light distribution of the entrance end surface of the optical rod 13A. FIG. 13C is a front view of a comparative example illustrating the light distribution of the entrance end surface of the optical rod 13A. FIG. 14A is a cross-sectional view illustrating the light which enters the light-emitting section in the headlamp in which the laser chip and the optical rod are provided separated from one another. FIG. 14B is a distribution map illustrating the light intensity distribution in the exit end surface of the optical rod. FIG. 14C is a distribution map illustrating the light intensity distribution in the illumination surface of the light-emitting section.

Furthermore, in the following description, the optical rod 13A which serves as the optical guide member is described. However, the effects thereof apply the same to the optical rods 13B and 13C which serve as the optical guide member.

In the present embodiment, as shown in FIGS. 1A and 1B and FIG. 11, the light intensity distribution profile of the exit end surface 13b, which serves as the exit end surface of the optical guide member, from which the light output from the optical rod 13A exits is projected as the shape of the irradiation pattern P1. There is a case in which the shape is similar, and there is also a case in which the shape is not similar, and the projection is enlarged or reduced in a fixed direction. In a case in which the shape is not similar, as shown in FIGS. 12A to 12D, for example, when the light exits the exit end surface 13b of the optical rod 13A and is subsequently compressed in the vertical direction in a cylindrical lens, the shape is not similar. There is a case in which the coupling of the laser beam to the optical rod 13A is simplified due to adopting such a configuration.

In addition, in the present embodiment, the laser beam spot 4b on the light-emitting section 4 of the light output from the optical rod 13A, is smaller than the light-emitting section 4. As a result, in the present embodiment, approximately the total luminous flux of the light output from the optical rod 13A substantially maintains the light intensity distribution on the exit end surface 13b of the optical rod 13A. In this state, the light enters a region (the approximate irradiation region) of a portion of the laser beam irradiation surface 4a of the light-emitting section 4 in the irradiation pattern P1 as the laser beam spot 4b. In the light-emitting section 4, the laser beam is converted into fluorescence, and a light-emitting pattern of approximately the same shape as the irradiation pattern P1 is formed. Furthermore, the light-emitting pattern is projected by an optical device such as a reflector as the projection pattern P2.

Accordingly, it is possible to control the shape of the projection pattern P2 using the light intensity distribution profile of the exit end surface 13b of the optical rod 13A. Therefore, it is possible to form a clear contrast of the projection pattern P2. In addition, in the light-emitting section 4, it is possible to use all of the light of that output from the optical rod 13A, thus, the efficiency is favorable.

Accordingly, it is possible to provide a light-emitting device which can efficiently form a clear edge of the projection pattern P2 on the projection surface.

In addition, in the light-emitting device of the present embodiment, as shown in FIG. 1A, the optical rod 13A has a refractive index distribution which is adjusted in order to control the light distribution profile of the projection pattern P2. Specifically, the optical rod 13A exhibits the refractive index distribution indicated by the gradation shown in FIG. 11. In other words, in FIG. 11, the darker the color of a portion, the higher the refractive index.

In other words, since the light optically guided through the inner portion of the optical rod 13A is focused on a portion which has a high refractive index, it is possible to increase the light intensity of the light output from the optical rod 13A in the portion which has a high refractive index. Accordingly, it is possible to control the light intensity distribution profile on the exit end surface 13b of the optical rod 13A by adjusting the refractive index distribution and the shape of the optical rod 13A. Therefore, by projecting the light distribution profile of the exit end surface 13b of the optical rod 13A onto the laser beam irradiation surface 4a of the light-emitting section 4, it is possible to form a clear edge in the irradiation pattern P1 on the laser beam irradiation surface 4a, and to control the light distribution profile of the irradiation pattern P1.

In addition, in the present embodiment, as shown in FIG. 3, the shape of the entrance end surface 13a of the optical rod 13A is arranged in a direction which facilitates the matching with the light distribution of the exit end portion of the laser chip 11. In other words, as shown in FIG. 13A, when the light distribution of the exit end portion of the laser chip 11 is an ellipse which is long in the horizontal direction, as shown in FIG. 13B, the shape of the entrance end surface 13a of the optical rod 13A is long in the horizontal direction. Further, the entrance end surface 13a of the optical rod 13A is arranged so as to contain the light distribution of the exit end surface formed from an ellipse which is long in the horizontal direction of the laser chip 11. Accordingly, as shown in FIG. 13C, the shape of the entrance end surface 13a of the optical rod 13A is not long in the vertical direction.

Accordingly, the efficiency of the coupling of the light emitted from the laser chip 11 with the optical rod increases.

In addition, in the headlamp 1 of the present embodiment, as described above, the light intensity distribution in the light output from the optical rod 13A includes an edge. In other words, for example, even if the light intensity distribution on the entrance end of the optical guide member is a general Gaussian distribution, it is possible to convert the light intensity distribution on the exit end surface 13b of the optical rod 13A to one which includes an edge, and it is possible to form a clear edge of the irradiation pattern P1.

Accordingly, it is possible to form a clear contrast at the end portion of a portion of the projection pattern P2 on the projection surface by matching the edge portion with the projection pattern P2 on the projection surface.

In this manner, the light-emitting device of the present embodiment includes the laser chip 11 which emits excitation light, the light-emitting section 4 which contains a phosphor, and the optical rod 13A. In the light-emitting device of the present embodiment, the excitation light emitted from the laser chip 11 is optically guided by the optical rod 13A, the light output from the optical rod 13A enters the light-emitting section 4, and the light-emitting device projects the fluorescence from the light-emitting section 4 onto the projection surface as the projection pattern P2. Furthermore, an edge is present in the light intensity distribution on the exit end surface 13b of the optical rods 13A, 13B and 13C.

In other words, for example, even if a portion of the light intensity distribution in the light output from the optical rod 13A is a general Gaussian distribution, when the optical guide member includes a portion (an edge) in which the light intensity drops discontinuously, it is possible to form a clear edge of the irradiation pattern P1 on the irradiation surface of the light-emitting section 4.

Accordingly, a portion (an edge) at which the light intensity drops discontinuously is matched with the edge of an end portion of a portion of the projection pattern P2 on the projection surface. Therefore, it is possible to form a clear edge at the end portion of a portion of the projection pattern P2 on the projection surface.

Accordingly, it is possible to provide a light-emitting device which can efficiently form a clear edge on the light-emitting section 4, that is, can efficiently form a clear edge of the projection pattern P2 on the projection surface.

In addition, in the light-emitting device of the present embodiment, in order to project, by irradiation, the edge present in the light intensity distribution of the light-emitting section 4, an edge is present in the light intensity distribution on the exit end surface 13b of the optical rod 13A. Accordingly, it is possible to project, by irradiation, the edge in the light intensity distribution of the light-emitting section 4.

In addition, in the light-emitting device of the present embodiment, the irradiation region of the light output from the optical rod 13A to the light-emitting section 4 is smaller than the external form of the light-emitting section 4.

Accordingly, it is possible to control the shape of the irradiation pattern P1 on the irradiation surface using the shape of the exit end surface 13b. Therefore, it is possible to form a clear edge of the irradiation pattern P1 on the irradiation surface. In addition, in the light-emitting section 4, it is possible to use all of the light of that output from the optical rod 13A, thus, the efficiency is favorable.

Accordingly, it is possible to provide a light-emitting device which can efficiently form a clear edge of the irradiation pattern P1 on the irradiation surface, that is, can efficiently form a clear edge of the projection pattern P2 on the projection surface.

Furthermore, for example, as shown in FIG. 14A, when the laser chip 11 and the optical rod 13C are provided separated from one another, as shown in FIGS. 14B and 14C, there is a case in which the laser beam spot 4b, which serves as the irradiation region to the light-emitting section 4, is larger than the light-emitting section 4. In other words, the light of a portion protruding from the laser beam spot 4b on the light-emitting section 4 is not necessary, and can also cause stray light. However, an edge is formed on the light-emitting section 4 using the waveguide path, and when compared with an example of the related art, a large amount of the light output from the optical rod 13A is utilized by decreasing the amount of luminous flux in this range.

In addition, in the light-emitting device of the present embodiment, the thickness of the light-emitting section 4 is ½ or less of the full width at half maximum of the irradiation pattern P1. Accordingly, it is possible to prevent a decrease in the contrast of the projected edge.

In addition, in the light-emitting device of the present embodiment, as shown in FIG. 13A, the optical rod 13A has a refractive index distribution which is adjusted in order to control the light intensity distribution on the exit end surface 13b of the optical rod 13A. As a result, it is possible to control the light distribution profile of the irradiation pattern P1 by adjusting the refractive index distribution of the optical rod 13A. Therefore, it is possible to form a clear edge of the irradiation pattern P1 on the irradiation surface.

In addition, in the light-emitting device of the present embodiment, the optical rod 13A and the light-emitting section 4 are provided separated from one another. Accordingly, it is possible to provide the light-emitting section 4 separately from the optical rod 13A and to improve the freedom of installation positioning of the light-emitting section 4.

Furthermore, in the light-emitting device of the present embodiment, the laser chip 11 and the optical rod 13A are both facing and connected to one another. Accordingly, since the laser chip 11 and the optical rod 13A are directly connected to one another, for example, it is not necessary to provide a lens or the like between the laser chip 11 and the optical rod 13A which optically connects the two, and the structure is simple.

In addition, in the light-emitting device of the present embodiment, it is possible to use the optical rod 13C which is formed from a multimode fiber. Accordingly, the cost is lower than using an article which is made to order other than an optical fiber, and the optical guide distance may be lengthened. Therefore, there are merits to using a multimode fiber in cases such as when the distance from the laser chip 11 to the light-emitting section 4 is long and when the two may not be connected in a straight line.

Accordingly, in a case in which the light-emitting device is used for the headlamp 1, it is possible to arrange the light source section 10 in a space which is vacant in the inner portion of the bonnet of the vehicle, thereby increasing the design freedom.

In addition, the headlamp 1 of the present embodiment includes the light-emitting device of the present embodiment. Furthermore, in the light-emitting section 4, fluorescence is emitted by the phosphor on the basis of the irradiation pattern P1 of the light intensity distribution in which an edge is present, and the fluorescence is projected onto the projection surface as the projection pattern. As a result, it is possible to adapt the light distribution profile of the illumination light of the vehicle headlamp 1 to the light distribution profile of the vehicle headlamp for passing or the like as stipulated by the law.

Accordingly, it is possible to provide the headlamp 1 which includes the light-emitting device which can efficiently form a clear contrast of the projection pattern P2 on the projection surface.

Furthermore, the illumination apparatus of the present embodiment includes the light-emitting device of the present embodiment. Furthermore, in the light-emitting section 4, fluorescence is emitted by the phosphor on the basis of the irradiation pattern P1 of the light intensity distribution in which an edge is present, and the fluorescence is projected onto the projection surface as the projection pattern. Accordingly, it is possible to provide the illumination apparatus which includes the light-emitting device which can efficiently form a clear contrast of the projection pattern P2 on the projection surface.

It should be understood by those skilled in the art that various modifications, combinations, sub-combinations and alterations may occur depending on design requirements and other factors insofar as they are within the scope of the appended claims or the equivalents thereof.

An embodiment of the present technology relates to a light-emitting device, a vehicle headlamp, and an illumination apparatus, each of which includes a light-emitting element which emits excitation light; a light-emitting section containing a phosphor, and an optical guide member; in which, the excitation light emitted from the light-emitting element is optically guided by the optical guide member, the light output from the optical guide member enters the light-emitting section, and the light-emitting section projects fluorescence onto the projection surface as a projection pattern. Further, it is possible to apply the above embodiment to a vehicle headlamp such as a headlamp. In addition, the illumination apparatus may also be a headlamp for passing (low beam). Further, the illumination apparatus may also be applied to a headlamp for a vehicle or a moving object other than the automobile (for example, a person, a ship, an airplane, a submarine, a rocket, or the like). Furthermore, for example, it is also possible to apply the illumination apparatus to an illumination apparatus such as a search light, a projector, a household illumination apparatus, a commercial illumination apparatus, and an exterior illumination apparatus.

What is claimed is:

1. A light-emitting device comprising:
    a light-emitting element which emits excitation light;
    a light-emitting section containing a phosphor; and
    an asymmetrical optical guide member comprising a light exiting end that forms a light beam having a predetermined edge in a cross-section thereof,
    wherein the excitation light emitted from the light-emitting element is optically guided by the optical guide member,
    the light beam output from the optical guide member enters the light-emitting section,
    the edge of the light beam output from the optical guide member is projected onto the light emitting section so that an edge is present in a light intensity distribution of the light-emitting section, and
    a light beam emitted from the light-emitting section has an edge in a cross-section thereof, which coincides with the edge of the light beam output from the optical guide member.

2. The light-emitting device according to claim 1,
    wherein an irradiation region of the light beam output from the optical guide member which enters the light-emitting section is smaller than an external form of the light-emitting section.

3. The light-emitting device according to claim 1,
    wherein a thickness of the light-emitting section is ½ or less of a full width at half maximum of the light intensity distribution of the light-emitting section.

4. The light-emitting device according to claim 1,
    wherein the optical guide member and the light-emitting section are provided separated from one another.

5. The light-emitting device according to claim 1,
    wherein the optical guide member has an adjusted refractive index distribution so as to control the light intensity distribution at the light exiting end of the optical guide member.

6. The light-emitting device according to claim 1,
    wherein the optical guide member is formed of a multi-mode fiber.

7. A vehicle headlamp comprising the light-emitting device according to claim 1,
    wherein in the light-emitting section, fluorescence is emitted by the phosphor on a basis of an irradiation pattern of the light intensity distribution in which the edge is present, and the fluorescence is projected onto a projection surface as a projection pattern.

8. An illumination apparatus comprising the light-emitting device according to claim 1,
    wherein in the light-emitting section, fluorescence is emitted by the phosphor on a basis of an irradiation pattern of the light intensity distribution in which the edge is present, and the fluorescence is projected onto a projection surface as a projection pattern.

* * * * *